(12) United States Patent
Ito

(10) Patent No.: US 9,786,250 B2
(45) Date of Patent: Oct. 10, 2017

(54) CONTROL APPARATUS, IMAGE PROCESSING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventor: Tadayuki Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 309 days.

(21) Appl. No.: 14/557,401

(22) Filed: Dec. 1, 2014

(65) Prior Publication Data
US 2015/0170375 A1 Jun. 18, 2015

(30) Foreign Application Priority Data
Dec. 12, 2013 (JP) ................. 2013-257394

(51) Int. Cl.
G09G 5/02 (2006.01)
H04N 1/60 (2006.01)
H04N 1/64 (2006.01)

(52) U.S. Cl.
CPC ............. *G09G 5/02* (2013.01); *H04N 1/6027* (2013.01); *H04N 1/64* (2013.01); *G09G 2360/06* (2013.01); *G09G 2360/122* (2013.01)

(58) Field of Classification Search
USPC ...................................... 382/162, 166, 167
See application file for complete search history.

(56) References Cited

U.S. PATENT DOCUMENTS

| 6,289,138 | B1 * | 9/2001 | Yip | G06F 9/3879 382/307 |
| 6,693,721 | B1 | 2/2004 | Suzuki | |
| 6,970,597 | B1 * | 11/2005 | Olding | G06T 3/4015 348/273 |
| 7,961,235 | B2 * | 6/2011 | Silverstein | G06T 3/4015 348/294 |
| 8,411,941 | B2 | 4/2013 | Ito | |

(Continued)

FOREIGN PATENT DOCUMENTS

JP 2000-148996 A 5/2000
JP 2009-141430 A 6/2009

*Primary Examiner* — Ishrat I Sherali
(74) *Attorney, Agent, or Firm* — Fitzpatrick, Cella, Harper & Scinto

(57) ABSTRACT

A control apparatus causes, to execute image processing of single-color image data, a processing apparatus configured to accept an image processing command including a plurality of fields, each capable of storing a respective one of a plurality of color components in a dot sequential format, and execute image processing by using pixel values included in the command. The control apparatus extracts, from single-color image data, a plurality of partial images by a number corresponding to the number of color components. The control apparatus acquires single-color pixel values from the respective partial images, and stores the single-color pixel values in the respective fields of the image processing command. A generated image processing command is input to the processing apparatus, and the processing apparatus executes image processing using the pixel values included in the command.

23 Claims, 17 Drawing Sheets

(56) References Cited

U.S. PATENT DOCUMENTS

| | | | |
|---|---|---|---|
| 8,712,170 B2* | 4/2014 | Matsuhira | H04N 1/415 |
| | | | 382/232 |
| 9,380,276 B2* | 6/2016 | Fujisawa | H04N 9/045 |
| 9,508,031 B2* | 11/2016 | Cave | G06K 15/1878 |
| 2006/0061600 A1* | 3/2006 | Beuker | G09G 5/005 |
| | | | 345/656 |
| 2006/0238830 A1* | 10/2006 | Dikeman | H04N 1/484 |
| | | | 358/500 |
| 2009/0141320 A1 | 6/2009 | Minamino | |
| 2013/0202202 A1* | 8/2013 | Hasu | G06T 3/4053 |
| | | | 382/166 |
| 2015/0097994 A1* | 4/2015 | Yokoyama | H04N 5/3572 |
| | | | 348/242 |
| 2015/0206274 A1* | 7/2015 | Anzai | G06T 1/20 |
| | | | 382/260 |

* cited by examiner

FIG. 9A
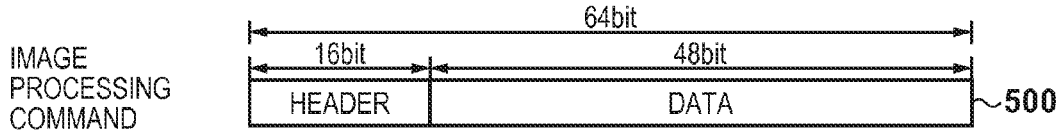
FIG. 9B
IMAGE PROCESSING COMMAND OF COLOR DOT SEQUENTIAL FORMAT
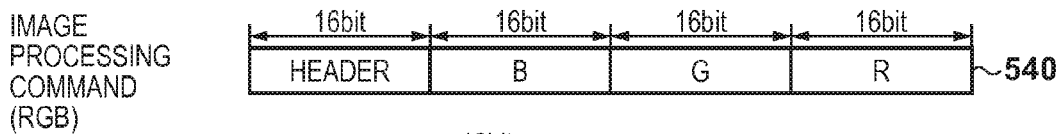
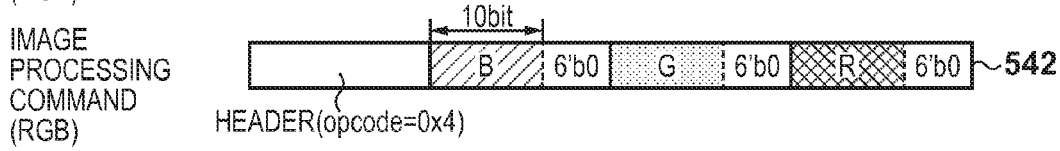
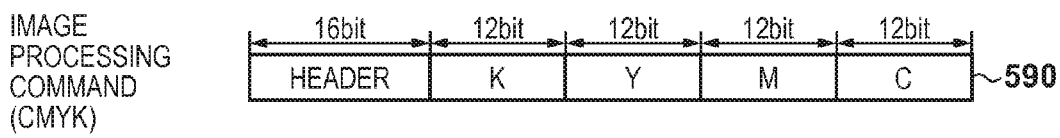
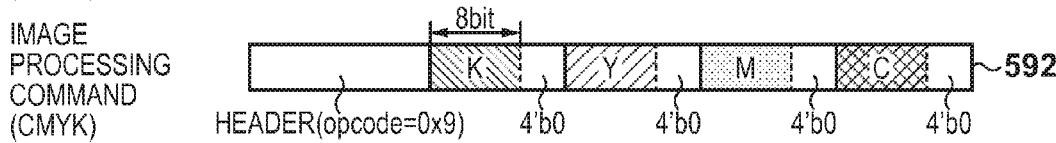
FIG. 9C
MONOCHROME (SINGLE-COLOR) IMAGE PROCESSING COMMAND
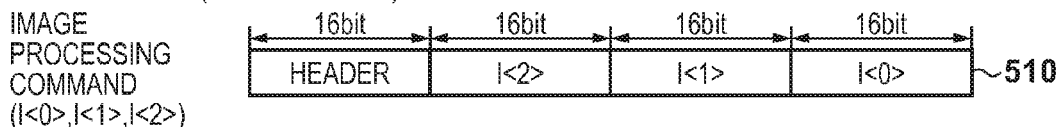
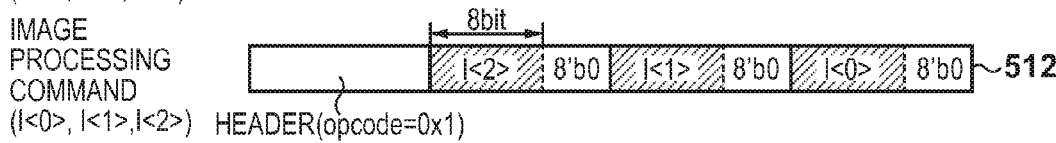
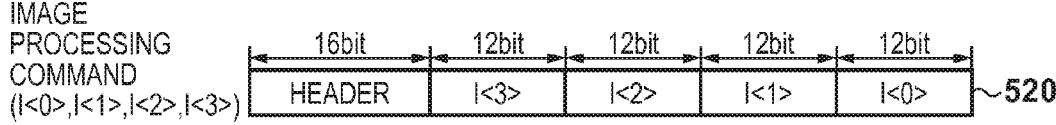
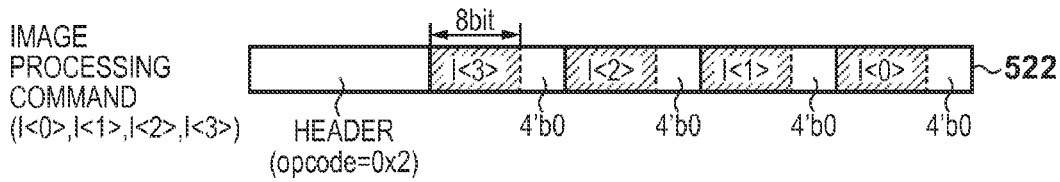

CONTROL APPARATUS, IMAGE PROCESSING APPARATUS, CONTROL METHOD, AND NON-TRANSITORY COMPUTER-READABLE STORAGE MEDIUM

BACKGROUND OF THE INVENTION

Field of the Invention

The present invention relates to a control apparatus, image processing apparatus, control method, and non-transitory computer-readable storage medium.

Description of the Related Art

When forming and outputting an image, local (neighbourhood) image processing such as spatial filter processing is sometimes applied. This local image processing is image processing of performing any calculation by using pixels in a spatial filter region, including a pixel to be processed (to be referred to as a processing pixel hereinafter). The local (neighbourhood) image processing enables, for example, edge emphasis, blur processing, and resolution conversion of converting an input image into an image of a desired size by enlargement or reduction. In the following description, this local (neighbourhood) image processing will be called "filter processing".

An image processing apparatus includes a filter circuit for a function of performing the above-described filter processing on an input image. In general, most of reading devices such as a scanner, printing devices such as a printer, and display devices such as a display can support a color image/color original (for example, an image having a plurality of colors such as an RGB color image or a CMYK color image). Image processing apparatuses mounted in many of these devices are often constructed basically for color processing. For example, the image processing apparatus includes filter circuits that process three colors for an RGB color image or four colors for a CMYK color image. In many cases, a general filter circuit is designed to be able to arbitrarily change the setting of a filter coefficient used in filter processing by a register setting or the like, so that this circuit can be used not only for one process but also for another processing. Hence, filter circuits corresponding to respective colors can be identical. The image processing apparatus can be parallelly equipped with filter circuits by the number of supported colors, such as three filter circuits for an RGB color image or four filter circuits for a CMYK color image. The device can include a plurality of image processing apparatuses corresponding to respective colors. For example, even when the image processing apparatus is equipped with only a filter circuit for one color, the whole device can support color processing by arranging image processing apparatuses by the number of supported colors. The unit of parallelized processing (granularity) corresponding to the number of colors in the color processing-based processing apparatus varies from a small unit of the circuit level to a large unit of the system level such as the processing apparatus.

When a monochrome (single-color) image is input to the color processing-based processing apparatus, the unit of parallelized processing (granularity) as described above can be used efficiently. By efficiently using the unit of processing, the image processing apparatus can increase the processing speed of a single-color image, compared to the processing speed of a color image.

For example, according to a technique described in Japanese Patent Laid-Open No. 2000-148996, an image processing apparatus includes a plurality of image processors. The image processing apparatus first determines which of a single-color original and a color original is an input original. For the single-color original, the image processing apparatus performs distributed parallel processing by dividing input image data and assigning the divided data to the plurality of image processors. Japanese Patent Laid-Open No. 2000-148996 also describes that when monochrome (single-color) images span a plurality of pages, the plurality of image processors execute the processes of the respective pages to increase the speed by distributed parallel processing.

Japanese Patent Laid-Open No. 2009-141430 describes an image processing apparatus including a plurality of reduction circuits. When an input original is a monochrome original having a plurality of pages, the originals of these pages are respectively assigned to the reduction circuits to increase the speed of original reduction processing by distributed parallel processing. Japanese Patent Laid-Open No. 2009-141430 also describes that some pages are divided and respectively assigned to the reduction circuits to perform distributed parallel processing.

One of color image/color original data storage formats is a dot sequential format, and the dot sequential format is widely employed in built-in devices such as a scanner, a printer, and a display. In the dot sequential format, a plurality of color components constituting one pixel are packed in one data unit and handled. The data storage method of the dot sequential format therefore has an advantage of reading out at once a plurality of color components constituting one pixel by one data access. When the data storage method of the dot sequential format is adopted, the image processing apparatus executes image processing on, as one unit of processing (granularity), one pixel having a plurality of color components that can be read out at once. An image processing apparatus supporting the dot sequential format need not particularly perform difficult control, and can be implemented by employing general image processing circuits that perform a pipeline operation synchronously in one pixel unit.

However, Japanese Patent Laid-Open Nos. 2000-148996 and 2009-141430 do not describe a method of increasing the speed by distributed parallelization of the performance of image processing at the time of monochrome (single-color) processing in a color processing-based image processing apparatus supporting image data of the dot sequential format.

The present invention has been made in consideration of the above situation, and provides a technique of increasing the speed by distributed parallelization of the performance of image processing at the time of single-color processing in an image processing apparatus capable of executing color processing supporting image data of the dot sequential format.

SUMMARY OF THE INVENTION

According to one aspect of the present invention, there is provided a control apparatus that performs control for causing, to execute image processing of single-color image data, a processing apparatus configured to accept an image processing command including a plurality of fields, each capable of storing a respective one of a plurality of color components in a dot sequential format, and execute image processing by using pixel values included in the image processing command, comprising: an extraction unit configured to extract, from single-color image data, a plurality of partial images by a number corresponding to the number of color components; a generation unit configured to acquire single-color pixel values from each of the plurality of partial images, store the single-color pixel values in each of the plurality of fields, and generate an image processing command; and an input unit configured to input the generated image processing command to the processing apparatus, and cause the processing apparatus to execute image processing using the pixel values included in the image processing command.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 9A to 9C are views showing examples of the structure of an image processing command;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In the following description, the arrangement of an image processing apparatus according to respective embodiments to be described later, processing on a color image, and the like will be explained. After that, processing on a monochrome image (single-color image) according to each embodiment will be explained.

(Arrangement of Image Processing Apparatus)

Figure 1:
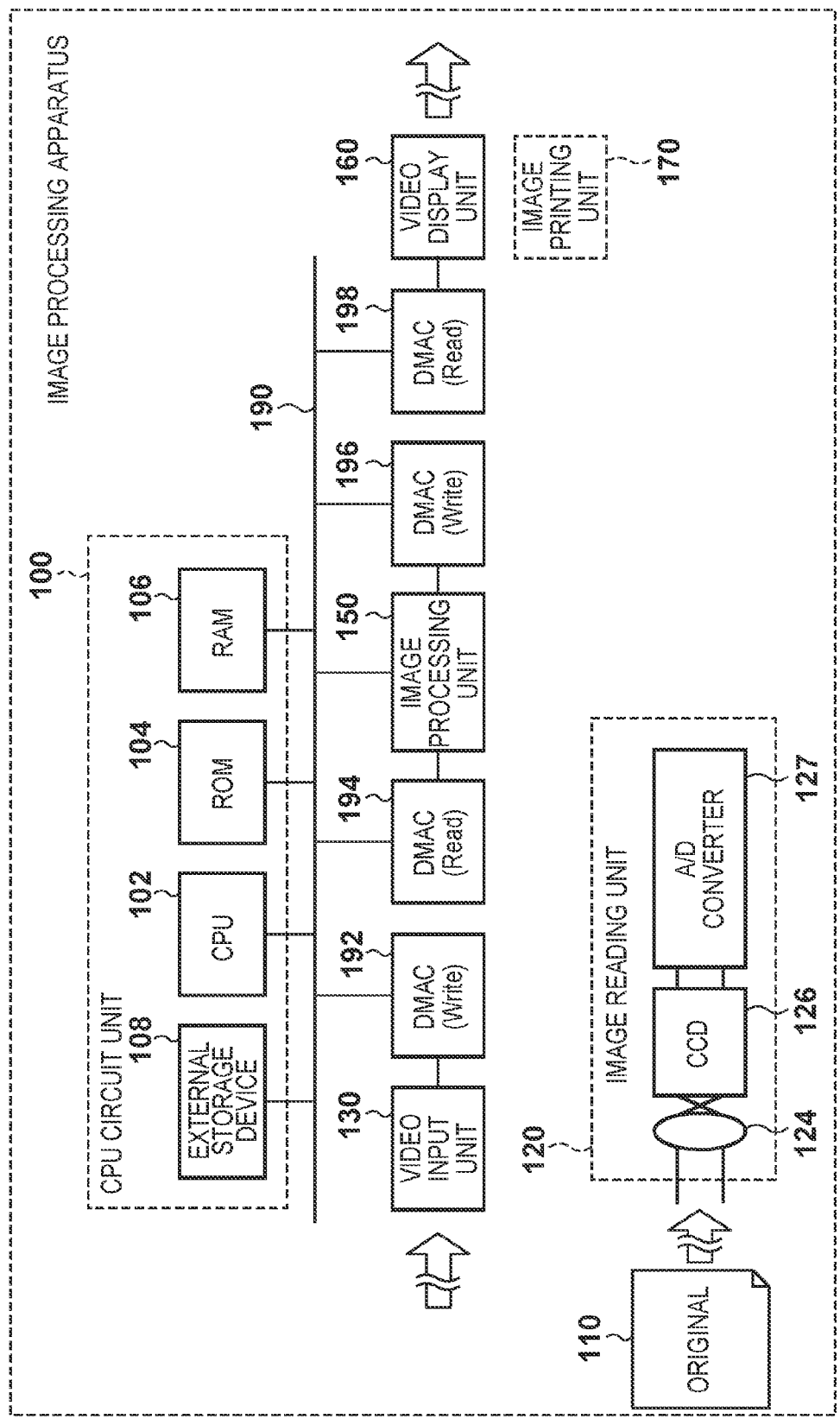
FIG. 1 is a block diagram showing an example of the arrangement of an image processing apparatus.

FIG. 1 is a block diagram showing an example of the arrangement of an image processing apparatus used in each embodiment to be described later. The image processing apparatus includes, for example, a CPU circuit unit 100, image reading unit 120, and image processing unit 150.

The image reading unit 120 includes, for example, a lens 124, a CCD sensor 126, and an analog signal processing unit (A/D converter) 127. The image reading unit 120 forms image information of an original 110 on the CCD sensor 126 via the lens 124. The CCD sensor 126 converts the image information into R (Red), G (Green), and B (Blue) analog electrical signals. The pieces of image information converted into the analog electrical signals are input to the analog signal processing unit 127, undergo correction and the like on the respective R, G, and B color components, and then are analog/digital-converted (A/D-converted). In this way, a full-color digital image signal (pixel value) is generated. The generated digital image signal is input to a video input unit 130, and then input to a DMAC (Direct Memory Access Controller) 192.

A CPU 102 sets in advance the operation of the DMAC 192, and the DMAC 192 stores the input digital image signal in the memory (a RAM 106) of the CPU circuit unit 100 via a shared bus 190. In the following description, data obtained by gathering digital image signals for a plurality of pixels so as to form one image or a partial image region will be called image data. Assume that the digital image signal is stored in the RAM 106 in the image data format. When performing image processing, the CPU 102 activates a DMAC 194 to read out image data stored in the RAM 106 and input a digital image signal corresponding to a pixel to be processed to the image processing unit 150.

The image processing unit 150 is a processing apparatus that processes data. For example, the image processing unit 150 performs, for example, correction of the individual difference of the reading element of a sensor device such as a scanner and color correction such as input gamma correction on an input digital image signal, and generates image data. A DMAC 196 stores the image data having undergone these processes in the RAM 106. As for control of the DMAC 196, for example, the CPU 102 sets in advance the operation of the DMAC 196 and activates the DMAC 196. The operation of the DMAC 196 is set to, for example, write image data after processing in the RAM 106.

The image processing unit 150 executes, on an input digital image signal, image processes for printing an image, such as input color correction processing, spatial filter processing, color space conversion, density correction processing, and halftone processing. The image processing unit 150 generates printable image data, and stores the image data in the RAM 106 via the DMAC 196.

A DMAC 198 reads out image data that has undergone image processing and is stored in the RAM 106, and outputs the image data to an image printing unit 170. The image printing unit 170 is, for example, a printer. The setting of the DMAC 198 is performed by, for example, the CPU 102. The image printing unit 170 includes, for example, a printout unit (not shown) using an inkjet head, a thermal head, or the like. The image printing unit 170 prints an image on paper based on the digital image signal of input image data. Although an example using the image printing unit 170 has been described above, the present invention is not limited to this. For example, the video input unit 130, a video display unit 160, or the like may be used. In this case, predetermined image (video) processing is performed on an input video, and the processed video is displayed on a display device (not shown) such as a display.

The CPU circuit unit 100 includes the CPU 102 for arithmetic control, a ROM 104 that stores permanent data and programs, the RAM 106 used to temporarily save data and load a program, and an external storage device 108. The CPU circuit unit 100 controls the image reading unit 120, the image processing unit 150, the image printing unit 170, and the like, and performs centralized control of the sequence of the image processing apparatus. The external storage device 108 is a storage medium such as a disk that stores parameters, programs, and correction data used in the image processing apparatus. Data, programs, and the like in the RAM 106 may be loaded from the external storage device 108.

(Arrangement of Image Processing Unit)

Figure 2:
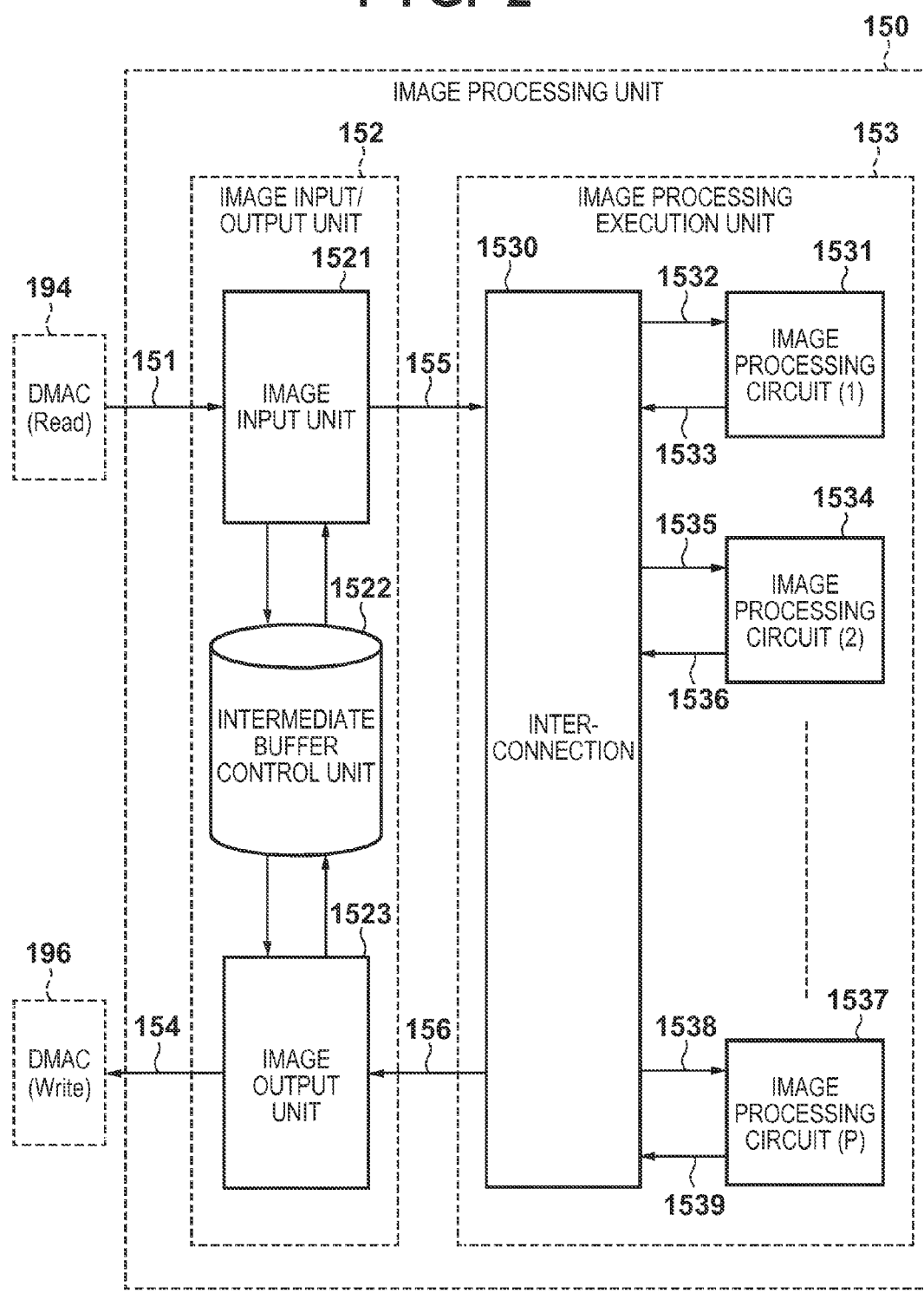
FIG. 2 is a block diagram showing an example of the arrangement of an image processing unit.

Subsequently, the image processing unit 150 that executes image processing on image data will be explained with reference to FIG. 2. Prior to execution of processing of the image processing unit 150, the CPU 102 activates the DMAC 194, and the DMAC 194 reads out image data from the RAM 106. The data structure of image data will be described later.

The readout image data is input to an image input/output unit 152 of the image processing unit 150 via an input port 151. When an image input unit 1521 included in the image input/output unit 152 acquires the image data, it holds the acquired image data in the storage area of an intermediate buffer included in an intermediate buffer control unit 1522. While reading out image data temporarily held in the intermediate buffer, the image input unit 1521 generates an image processing command including data of pixel values in a dot sequential format (to be described later), and inputs the image processing command as an input image processing command 155 to an image processing execution unit 153.

The image processing execution unit 153 executes predetermined image processing on the input image processing command 155, and outputs, to the image input/output unit 152, the image processing command 156 including data of pixel values after the image processing. Details of the image processing execution unit 153 will be described later. At this time, the input image processing command 155 and the output image processing command 156 are image processing commands including data of pixel values corresponding to a plurality of color components of a predetermined dot sequential format. The image processing execution unit 153 can be constituted by, for example, pipeline circuits that operate synchronously in the command unit.

Here, image data includes a plurality of pixel values of the dot sequential format. The image input/output unit 152 generates a plurality of image processing commands from a plurality of pixel values, and inputs them to the image processing execution unit 153. The image input/output unit 152 receives a plurality of image processing commands 156 that have been output from the image processing execution unit 153 and include pixel values having undergone image processing. The image input/output unit 152 then extracts a pixel value of the dot sequential format from one image processing command 156. The image input/output unit 152 temporarily stores the extracted pixel value in the intermediate buffer within the intermediate buffer control unit 1522. The image input/output unit 152 repeats this storage processing, extracts a plurality of pixel values from the plurality of image processing commands 156, and gathers the plurality of pixel values to form image data. The image input/output unit 152 reads out the formed image data from the intermediate buffer, and sends it as output image data after image processing to the DMAC 196 via an output port 154. As described above, the DMAC 196 has already been activated by the CPU 102, and writes the received output image data in the RAM 106.

More specifically, in the image processing unit 150, image data is acquired from the DMAC 194 via the image input/output unit 152, image processing is executed on the image by the image processing execution unit 153, and the image data after the image processing is output to the DMAC 196 via the image input/output unit 152. In this fashion, the image processing unit 150 performs image processing on image data in the image processing apparatus, and returns the image data after processing to the image processing apparatus.

(Band Processing as Example of Region Division Method)

Image data region division usable in each embodiment to be described later will be explained. This embodiment assumes that band processing is used as one region division method. The band processing will be described with reference to FIGS. 3 to 5. In the band processing, for example, one image data 300 is divided into band regions 301 to 304, as represented by 3001 to 3004 of FIG. 3, and various image processes are sequentially executed on the respective band regions. Note that the band region is obtained by dividing image data in either the main scanning direction or the sub-scanning direction. The band region and image data have the same length in either the main scanning direction or the sub-scanning direction. For example, in FIG. 3, image data is divided in the sub-scanning direction, and the image data and the band region have the same length in the main scanning direction and have different lengths in the sub-scanning direction. The divided elongated region will be called a band region, a storage area where data included in the band region is expanded will be called a band memory, and processing of dividing image data will be called band division. The band memory may be allocated as a storage area in the RAM 106 or as an area in an appropriate storage device (for example, the external storage device 108, and so on) on the system. For descriptive convenience, an example in which the band memory is allocated in the RAM 106 will be explained.

In the following description, the coordinate system (main scanning direction—sub-scanning direction) of image data is defined by a new coordinate system (band region coordinate system) in the directions of length and height, and the band region is expressed by length×height, as represented by 3005 of FIG. 3. The length of the band region, that is, the size of one side of the band region in the direction of length is either the value of a length of image data in the main scanning direction or the value of a length in the sub-scanning direction. The height of the band region, that is, the size of one side of the band region in the direction of height is an arbitrary value. For example, in 3001 to 3004 of FIG. 3, the direction of length is the main scanning direction, and the direction of height is the sub-scanning direction. To the contrary, for example, when image data is divided in the main scanning direction, as in 5001 to 5003 of FIG. 5, the direction of length is the sub-scanning direction, and the direction of height is the main scanning direction, as represented by 5004 of FIG. 5. Band division as in FIG. 5 may be performed when, for example, the size of image data in the main scanning direction is larger than that in the sub-scanning direction.

Figure 3:
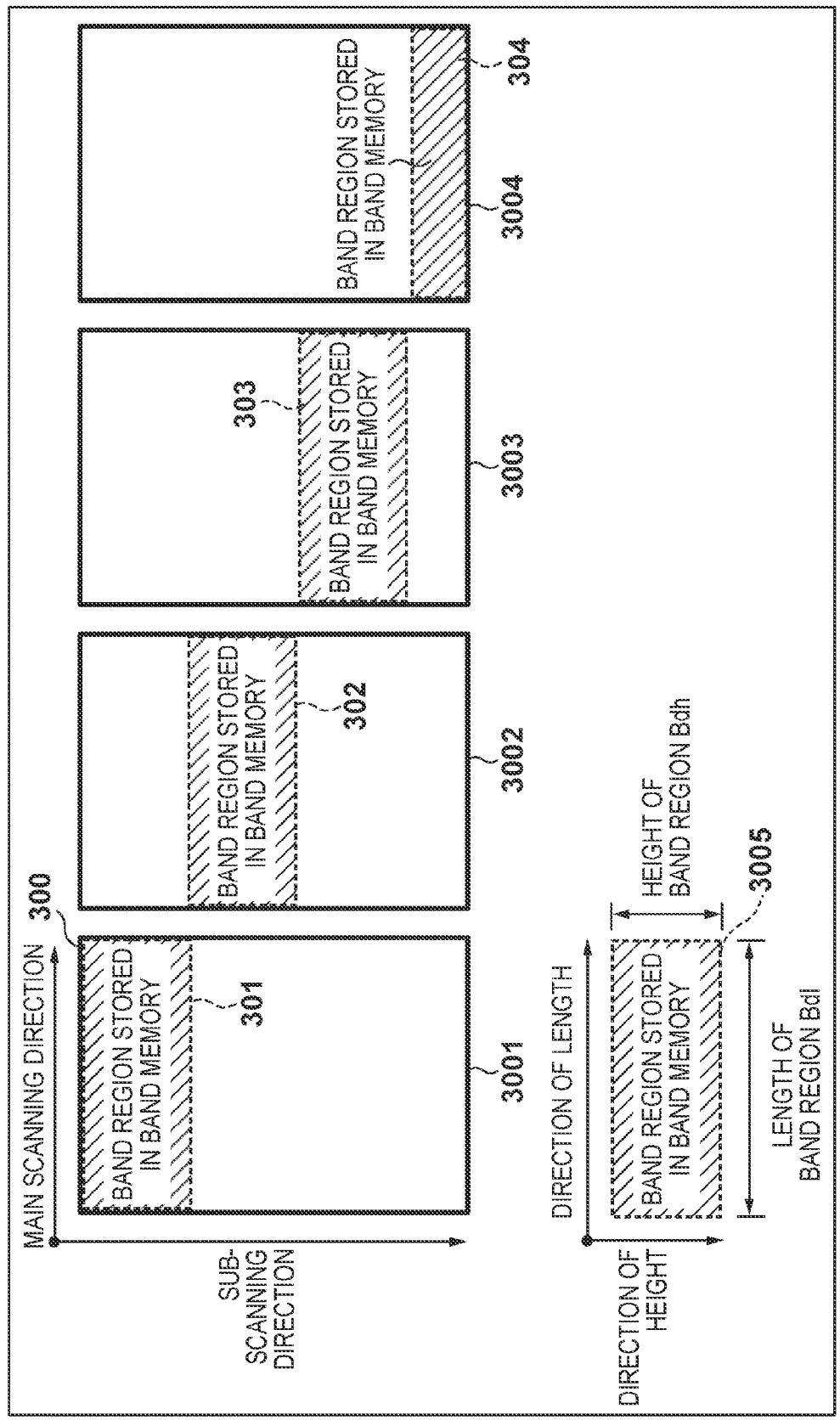
FIG. 3 is a view showing an example of a band region to undergo band processing.

In band processing, first, the first band region 301 in FIG. 3 is expanded in the band memory of the RAM 106, and undergoes image processing. Then, the second band region 302 is expanded by overwrite in the band memory of the RAM 106 in which the first band region 301 has been expanded, and undergoes image processing. Further, the third band region 303 is expanded by overwrite in the band memory of the RAM 106 in which the second band region 302 has been expanded, and undergoes image processing. Finally, the fourth band region 304 is expanded by overwrite in the band memory of the RAM 106 in which the third band region 303 has been expanded, and undergoes image processing. As is apparent from FIG. 3, the lengths of the band regions 301 to 304 are equal, but their heights may be different. For this reason, the height of the band memory serving as a storage area allocated in the main memory may be determined by a band region (in FIG. 3, the first to third band regions 301 to 303) having a largest size of one side in the direction of height.

Figure 4:
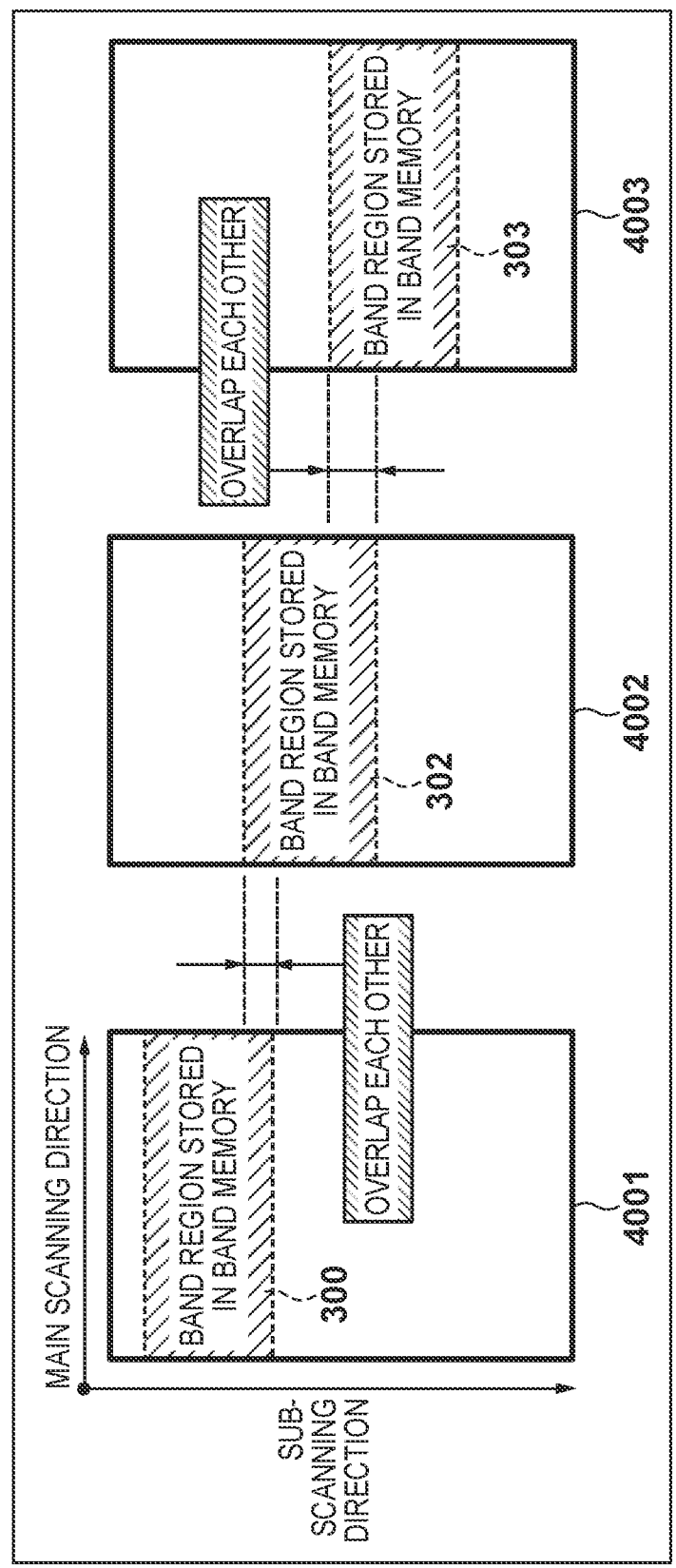
FIG. 4 is a view showing an example of a band region to undergo band processing.
Figure 5:
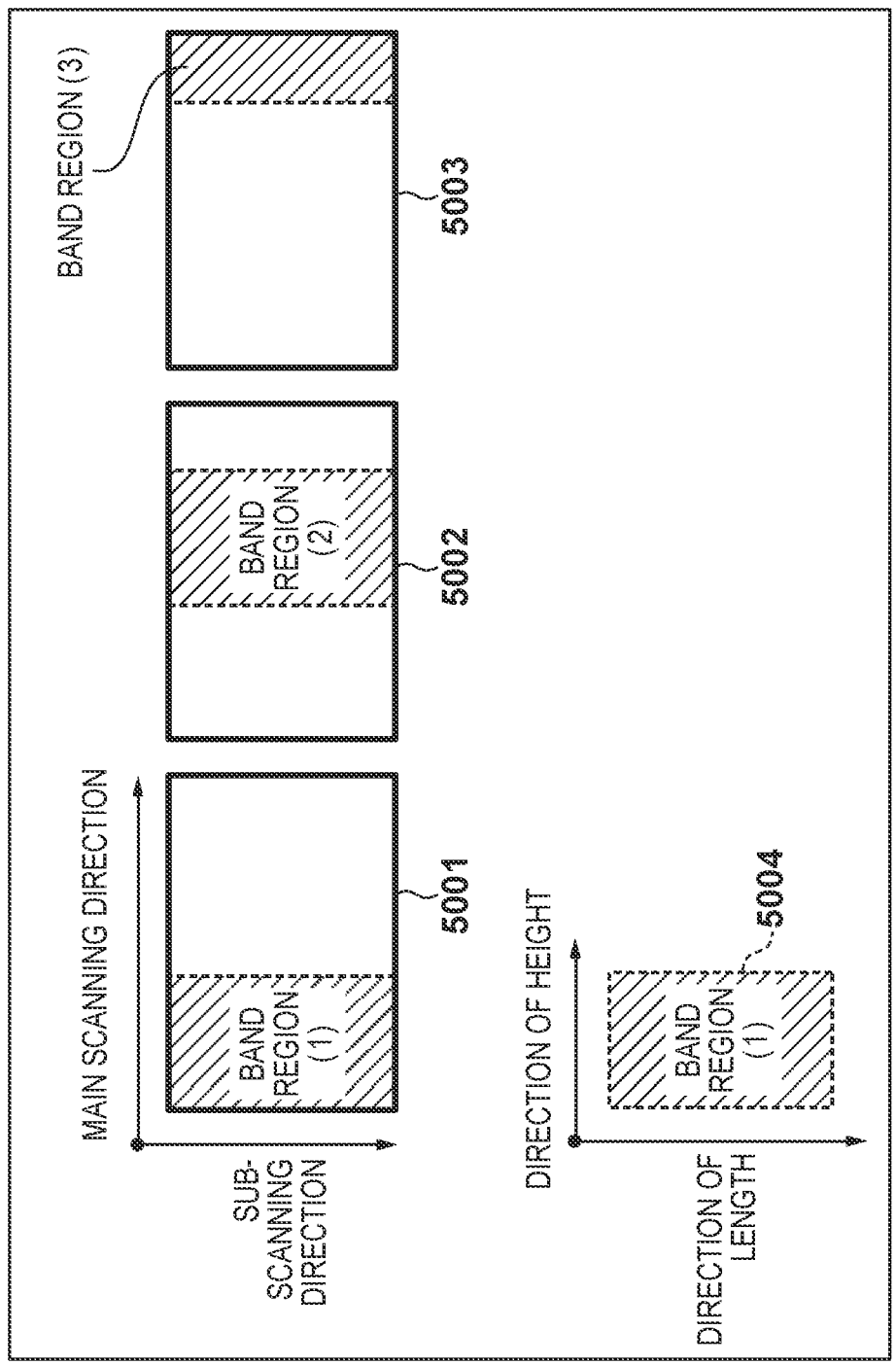
FIG. 5 is a view showing an example of a band region to undergo band processing.

Since local (neighbourhood) image processing such as spatial filter processing is performed without a gap between band regions in band processing, each band region may be constructed to partially overlap an adjacent region at the boundary, as shown in FIG. 4. In this case, pixels are scanned one by one in the direction of height in each region. The capacity of a delay memory for holding processing pixels necessary for local (neighbourhood) image processing is defined by the height of each region. Accordingly, the delay memory necessary for local (neighbourhood) image processing can be saved.

(Data Structure of Color Image Data)

Next, an example of the data structure of color image data of the dot sequential format will be explained. For example, for RGB color image data in which one pixel of a color image is constituted by R (Red), G (Green), and B (Blue), the respective colors are packed in one image data and handled as one data unit in the dot sequential format. Similarly, even for CMYK color image data in which one pixel of a color image is constituted by C (Cyan), M (Magenta), Y (Yellow), and K (blacK), the respective colors are packed in one image data and handled as one data unit in the dot sequential format.

Figure 6:
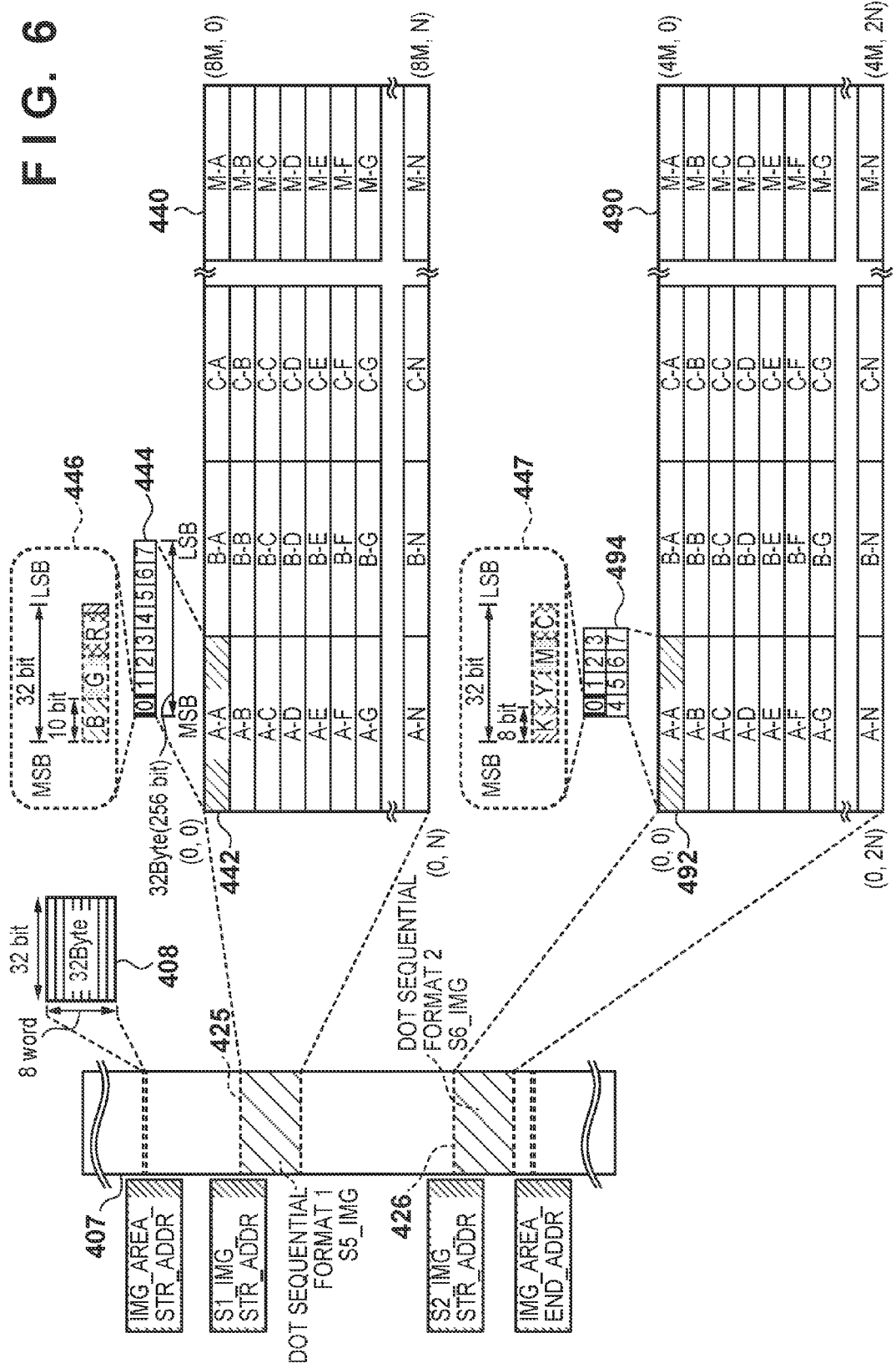
FIG. 6 is a view for explaining an example of storage of image data and an example of the data structure.

These image data of the dot sequential format are temporarily stored in the RAM 106, as described above. In general, the RAM 106 is often constructed by a low-cost DRAM. When reading/writing image data via the DMAC in the above-described manner, the image data can be handled in a unit capable of read/write from/in the DRAM without degrading the performance. The image data storage method of the RAM 106 in this case and the data structure of image data will be exemplified with reference to FIG. 6. FIG. 6 shows a state in which data is stored in the RAM 106 (DRAM). In the example of FIG. 6, given data areas (areas from IMG_AREA_STR_ADDR to IMG_AREA_END_ADDR) are allocated, and various image data necessary for image processing are stored there.

FIG. 6 shows an example of storage of the structure of image data of the dot sequential format in the RAM 106. FIG. 6 shows an example in which two types of image data S1_IMG 425 and S2_IMG 426 are stored in the data area of the RAM 106 (DRAM). In this example, the minimum unit of the capacity of image data to be stored is 32 bits×8 words=32 bytes, as represented by 408 of FIG. 6, so that image data can be read/written without degrading the performance of the DRAM. That is, the storage capacity of each of the image data S1_IMG 425 and the image data S2_IMG 426 is an integer multiple of 32 bytes. Note that the read/write unit of image data need not always be 32 bytes depending on the constitution method of the RAM 106 in the image processing apparatus, the type of storage device (for example, DRAM) that implements the RAM 106, the type of image processing to be executed, and the like. When the read/write unit is changed, a method of calculating the capacity of the intermediate buffer (to be described later) for storing image data is changed.

Next, the data structure of image data will be explained in detail. Image data 440 has pixel values including the color components of the first color R (Red), second color G (Green), and third color B (Blue) in the dot sequential format. One region 442 included in the image data 440 is 32-byte data, and a plurality of (eight) pixel values are packed in one region 442 (444). In each of these eight pixel values, R, G, and B values each of 10 bits are packed in the dot sequential format (446). In this example, the remaining 2 bits are invalid data for easily accessing the DRAM, and no data is stored there.

Image data having another data structure will be explained. For example, image data 490 has pixel values including the color components of the first color C (Cyan), second color M (Magenta), third color Y (Yellow), and fourth color K (blacK) in the dot sequential format. One region 492 included in the image data 490 is 32-byte data, and a plurality of (eight) pixel values are packed in one region 492 (494). In each of these eight pixel values, C, M, Y, and K values each of 8 bits are packed in the dot sequential format (447).

Note that one region 442 or 492 in the above-mentioned examples include information of eight pixels and is constituted as 32-byte data. At this time, each region may be determined as a region of one pixel in the longitudinal direction×eight pixels in the lateral direction, like the region 442, or as a region of two pixels in the longitudinal direction×four pixels in the lateral direction, like the region 494. In this case, when the image data 440 or 490 is constituted by M regions in the longitudinal direction×N regions in the lateral direction, the image data 440 has a size of 8M×N pixels, and the image data 490 has a size of 4M×2N pixels.

(Image Data Input/Output Method)

Figure 8:
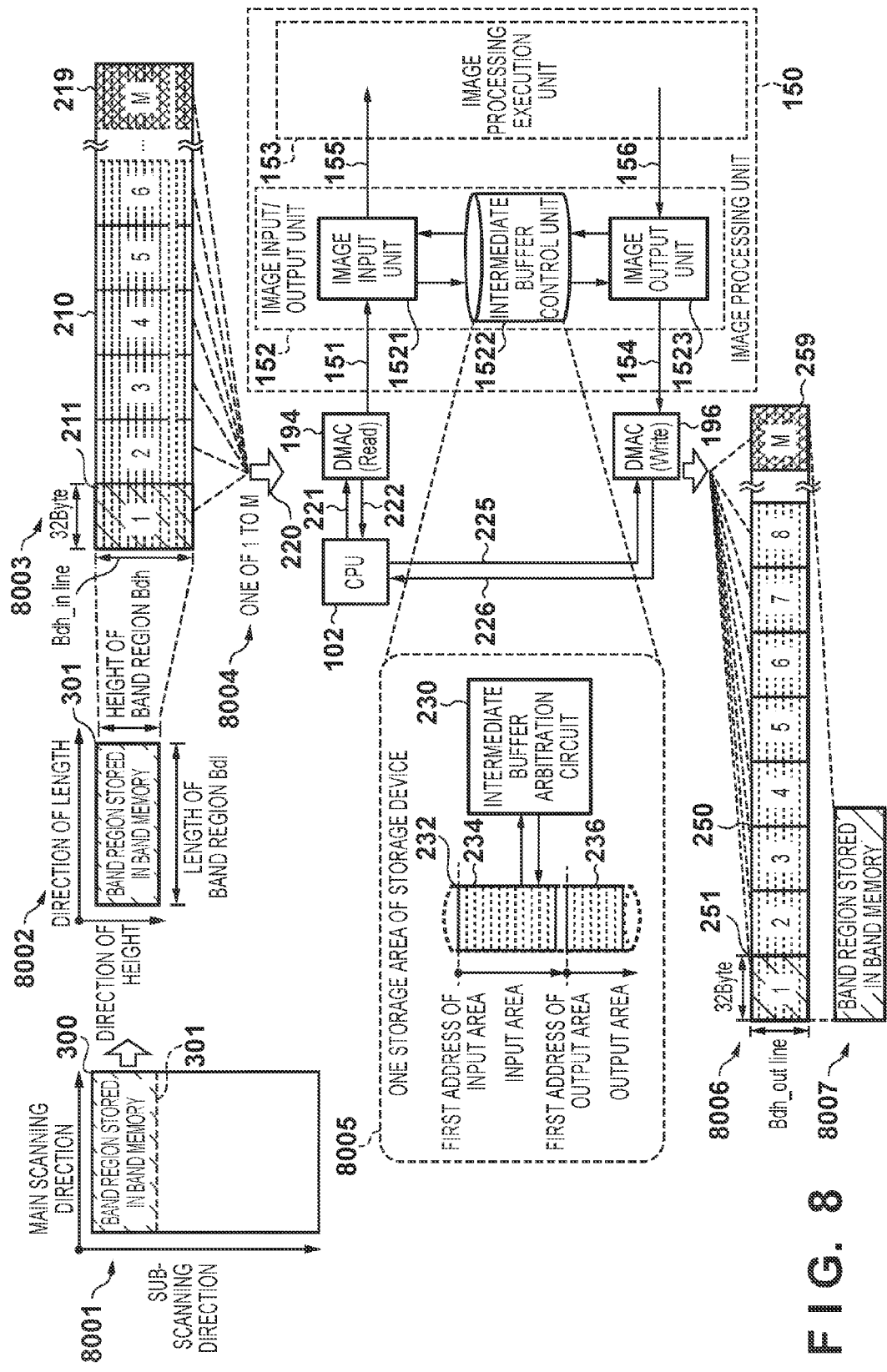
FIG. 8 is a view showing an example of an image data input/output operation.

FIG. 8 is a view for explaining an image data input/output method from the RAM 106 to the image input/output unit 152 or from the image input/output unit 152 to the RAM 106 when the image processing method according to this embodiment is used. The image processing apparatus extracts the band region 301 from one image data 300, and stores it as input image data in the RAM 106, as represented by 8001 and 8002 of FIG. 8. The input image data of the band region has a data structure of the dot sequential format having the 32-byte unit for easy handling in the RAM 106, as described above with reference to FIG. 6. Therefore, the input image data of the band region has a data structure, like input image data 210 in 8003 of FIG. 8.

In 8004 of FIG. 8, the DMAC 194 reads out the input image data 210 of the band region from the RAM 106 via the shared bus 190 in FIG. 1, and inputs it to the image processing unit 150. The input image data 210 is divided into M small pixel regions (sub-regions), that is, a region (1) 211 to a region (M) 219 in a processing unit of 32 bytes×Bdh_in in accordance with the above-mentioned data structure. The DMAC 194 reads out input image data of the M sub-regions (processing units) one by one from the sub-region (1) 211 to the sub-region (M) 219, and inputs them to the image processing unit 150. The image processing unit 150 receives the input image data of each sub-region (processing unit), and executes image processing in this unit.

The DMAC 194 operates based on, for example, "first address of the readout destination", "continuous readout amount (how many times 32-byte data are read out continuously)", "increment address", and "repetition count" input by the CPU 102.

For example, these items are as follows for RGB image data of the dot sequential format in FIG. 6:
"first address": S1_IMG_STR_ADDR
"continuous readout amount": one (32 bytes)
"increment address": data amount of one line=32 bytes×M
"repetition count": height of band region=Bdh_in times With these settings, first, 32-byte data is read out from the first address S1_IMG_STR_ADDR. In order to acquire the next data, the address is incremented by 32 bytes×M to skip readout of data on the first row in the sub-regions (2) to (M), and read out 32-byte data on the second row of the sub-region (1) 211. By reading out data by the repetition count Bdh_in, that is, data on the Bdh_in rows of the sub-region (1) 211, all data of the sub-region (1) 211 can be read out. In readout of input image data in the sub-regions (2) to (M), the DMAC 194 is operated while the "first address" is sequentially shifted by every 32 bytes. In this manner, the image processing apparatus reads out image data of a given sub-region from the RAM 106 by DMA transfer.

The image input unit 1521 of the image input/output unit 152 receives input image data from the DMAC 194. The image input unit 1521 transfers the data to the intermediate buffer control unit 1522, and the intermediate buffer control unit 1522 temporarily stores the received input image data in an input area 234 of the internal intermediate buffer (storage device). In general, the capacity of the input area 234 is a capacity capable of storing image data of a sub-region (processing unit) serving as the unit of one DMA transfer. When DMA transfer or transfer of input image data of one band region is completed, the DMAC 194 may notify the CPU 102 of the completion by using an interrupt signal 222.

After that, the image input unit 1521 reads out the temporarily held input image data of the sub-region via the intermediate buffer control unit 1522. The image input unit 1521 extracts pixel values including the color components of one pixel packed in the dot sequential format, sequentially generates image processing commands (to be described later), and inputs them to the image processing execution unit 153. The image processing execution unit 153 performs image processing by using data of the pixel values included in the input image processing commands, and generates image processing commands after processing. Note that details of the image processing execution unit 153 will be described later.

Next, an image output unit 1523 extracts pixel values (RGB or CMYK) of the dot sequential format from the image processing commands after processing, and transfers them to the intermediate buffer control unit 1522 to store them as image data to be output to the external storage device 108. At this time, the data structure of the output image data keeps the above-mentioned dot sequential format in FIG. 6. However, the shape of the output image data may be changed from a shape at the time of input, like 250 in 8006 of FIG. 8. The image processing execution unit 153 executes various image processes in which the size of an input pixel region and that of an output pixel region are different. Thus, the number of pixels of the input image data 210 and the number of pixels of output image data 250 are different. The height of the output band region of the output image data 250 is Bdh_out. The length of the band region of the output image data 250 is 8×N. That is, the input image data 210 and the output image data 250 are different in the capacity of the sub-region (processing unit) because the heights of the band regions are different. Since the lengths of the band regions are different, too, the number of sub-regions (processing units) changes from M to N. However, the data structure is the same between the input and the output, so the capacity of an output area 236 of an intermediate buffer 232 can be set based on the same concept as that of the capacity of the input area 234.

The image output unit 1523 receives, for example, Bdh_out pixels×four columns, and when all output image data of a sub-region (1) 251 are stored in the output area 236 of the intermediate buffer 232, stops the reception of the image processing command 156 after processing from the image processing execution unit 153. The image output unit 1523 sequentially reads out the output image data of the output area 236 and sends them to the DMAC 196. The DMAC 196 writes the image data after processing in the RAM 106 in accordance with an instruction signal (225 in 8004 of FIG. 8) from the CPU 102. The same operation is sequentially repeatedly executed from the sub-regions (2) to (N), writing back, in the RAM 106, all output image data of the output band region represented in 8007 of FIG. 8.

(Structure of Image Processing Command)

As represented by 500 of FIG. 9A, the image processing command includes "header" and "data". In "data", pixel values of the dot sequential format are stored. By using this command, the image processing apparatus according to this embodiment pipeline—operates an image processing circuit (1) 1531 to image processing circuit (P) 1537 of the image processing execution unit 153 synchronously in one pixel unit to perform image processing on image data of the dot sequential format.

As shown in FIG. 9B, the image processing command can support a plurality of dot sequential formats. In the example of FIG. 9B, the image processing command can support the R (Red), G (Green), B (Blue) format and the C (Cyan), M (Magenta), Y (Yellow), K (blacK) format by switching "op code" of "header".

(Processing by Image Processing Execution Unit)

The image processing execution unit 153 of the image processing unit 150 will be explained with reference to FIG. 2. The image processing execution unit 153 is constituted by P image processing circuits, that is, the image processing circuit (1) 1531 to the image processing circuit (P) 1537, and an interconnection 1530. The respective P image processing circuits and the interconnection 1530 are connected to each other via ports such as input ports 1532, 1535, and 1538, and output ports 1533, 1536, and 1539.

The image processing circuit performs processing including at least one of input color correction processing, color space conversion, density correction processing, halftone processing, spatial filter processing, resolution conversion, trimming processing, edge extension processing, IP conversion, and chroma upsampling. These image processing circuits may be implemented by hardware such as pipeline circuits, or by a processor, a program (software), and the like. For example, the image processing circuits receive the input image processing command 155 from the input ports 1532, 1535, and 1538 and the like, perform processing, and output the image processing command 156 after processing from the output ports 1533, 1536, and 1539.

The interconnection 1530 is implemented by a connection function such as a crossbar or a ring bus, and can arbitrarily switch the connection destinations of the input port and output port. By setting the designations of the connection destinations of these ports by the CPU 102, the interconnection 1530 can change, for example, the execution order of the P image processing circuits or bypass some processes.

In this fashion, the image processing execution unit 153 can implement desired image processing by selecting and combining various processes in accordance with an application.

The image processing execution unit 153 receives a plurality of image processing commands, and extracts pixel values including the color components of one pixel from each of these image processing commands. The image processing execution unit 153 performs image processing by using the extracted pixel values of one pixel, and generates the pixel values of one pixel after processing. At this time, the image processing circuit (1) 1531 to image processing circuit (P) 1537 of the image processing execution unit 153 perform pipeline image processing synchronously in one pixel unit.

As described above, an image processing command is input from the image input/output unit 152 to the image processing execution unit 153 for each sub-region. The image processing execution unit 153 can perform image processing such as filter processing using a pixel region including one or more pixels. At this time, for example, processing proceeds while sliding the pixel region serving as the input of filter processing in the direction of height of the band region (sub-scanning direction on the paper surface). After outputting pixel values of one column in the direction of height, processing for outputting pixels of the next column is executed. More specifically, a plurality of pixel values included in a pixel region are multiplied by a predetermined weight coefficient, and all these values are added to calculate one output pixel. The image processing command after processing is output to the image output unit 1523 of the image input/output unit 152 for every pixel. In this way, the image processing apparatus according to this embodiment can apply image processing including filter processing to color image data of the dot sequential format.

Subsequently, a case in which image processing is performed on monochrome (single-color) image data at high speed on the premise that the image processing apparatus supporting the above-mentioned dot sequential format is used will be explained.

(Data Structure of Single-Color Image Data)

Figure 7:
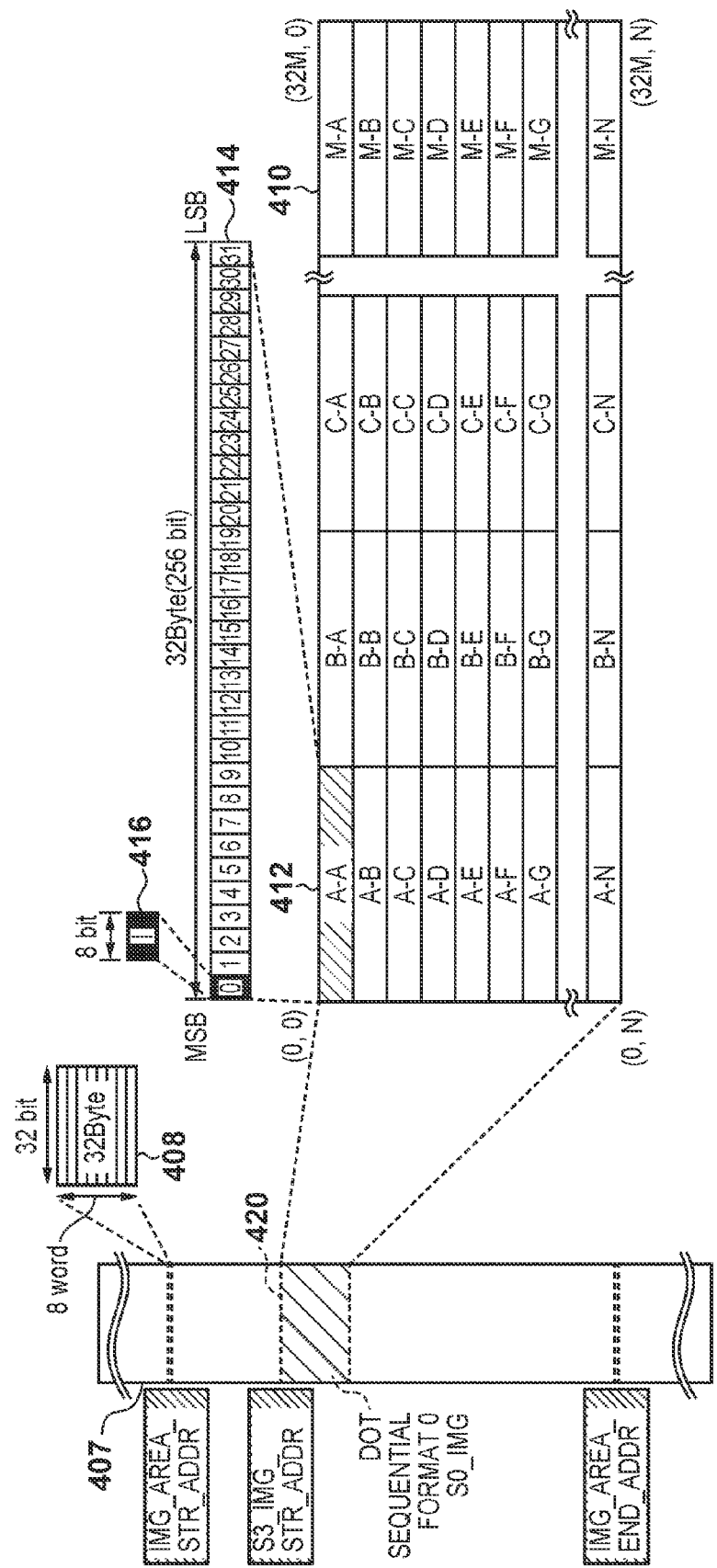
FIG. 7 is a view for explaining another example of storage of image data and another example of the data structure.

First, an example of the data structure of single-color image data will be described with reference to FIG. 7. In the example of FIG. 7, single-color image data is stored in a data area S0_IMG 420 of the RAM 106 (DRAM). Even in single-color image data, the minimum unit of the capacity of each image data to be stored can be 32 bytes (32 bits×8 words) so that image data can be read/written without degrading the performance of the DRAM, similarly to color image data. Note that the storage capacity of single-color image data in the data area S0_IMG 420 is an integer multiple of 32 bytes.

Next, the data structure of single-color image data will be explained. Image data 410 is stored as data that expresses each pixel included in the area S0_IMG 420 by the luminance value (intensity), grayscale, or the like. A region 412 included in the image data 410 is 32-byte data, and 32 8-bit data are packed in the region 412 (414). One single-color pixel value is expressed by one 8-bit data (416). In the following description, this 8-bit data is indicated by a symbol "I". The image data 410 in FIG. 7 includes M×N regions each including 32 pixel data, and represents single-color image data having a size of 32M×N pixels. Although the region 412 includes 32 pixels in the lateral direction in FIG. 7, it can include a total of 32 pixels such as 16 pixels in the longitudinal direction×2 pixels in the lateral direction. When the region 412 includes 16 pixels in the longitudinal direction×2 pixels in the lateral direction, the image data 410 represents single-color image data having a size of 16M×2N pixels.

There are several techniques for increasing the speed of image processing of single-color image data by using the hardware resource of color image processing, as described above. When a processing apparatus supporting the dot sequential format is used, one image processing command can include a plurality of single-color pixel data by storing the single-color pixel data in respective fields representing a plurality of colors (R, G, and B, or C, M, Y, and K) in the above-described image processing command. However, when filter processing is applied in image processes, these image processes are performed using all the pixel values (processing pixels) of the pixel region including pixels around a pixel of interest to be processed. In this case, even if filter circuits are prepared for respective color components, all processing pixels can be input to a filter circuit corresponding to processing regarding one pixel of interest, but some processing pixels are not input to filter circuits corresponding to processing regarding the remaining pixels. Hence, only one of the plurality of filter circuits can be used.

Instead of storing single-color pixel data in the dot sequential format in respective fields representing a plurality of colors of an image processing command, image data to be processed is divided, and pixels are extracted one by one from the respective divided regions and stored. This makes it possible to effectively use a plurality of filter circuits because a plurality of pixels of a single-color image stored in the image processing command lose a relationship with adjacent pixels (surrounding pixels). Several practical embodiments will be explained.

First Embodiment

Figure 10:
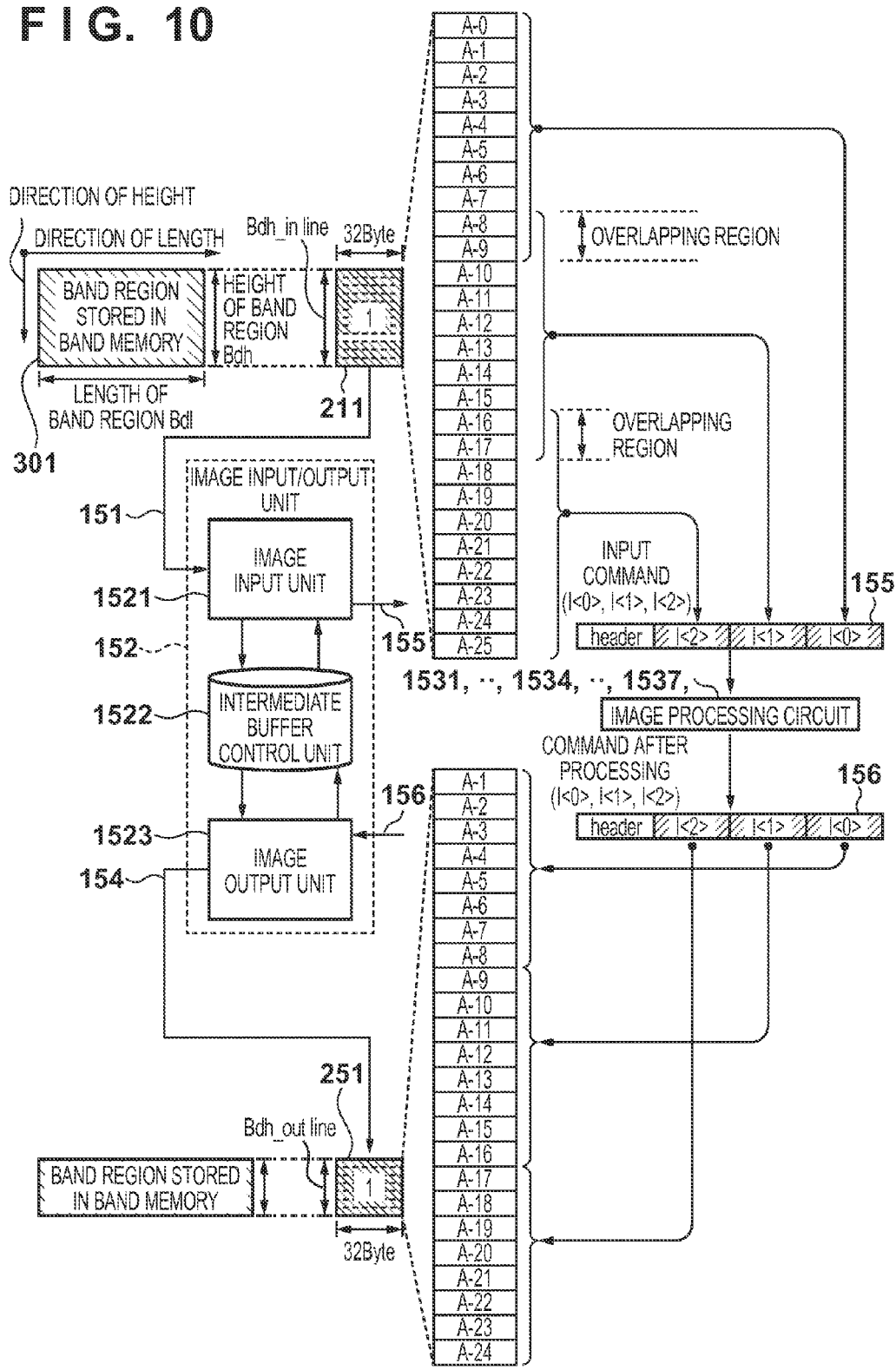
FIG. 10 is a view for explaining an example of division of a single-color image and command generation.

A command in which the number of colors is three (that is, the number of fields for storing pixel data is three), like an image processing command for RGB image data, will be exemplified. In this embodiment, as shown in FIG. 10, the sub-region of single-color image data is temporarily stored in an intermediate buffer from one band region 301 on the paper surface by using one DMA transfer, as in readout of a color image of the dot sequential format.

Thereafter, the DMA-transferred sub-region is subdivided. At this time, overlapping regions are set in consideration of pixel regions necessary for filter processing so that all processing pixels in filter processing are input to each of a plurality of filter circuits. The sub-region is divided into three partial images in consideration of the overlapping regions. The first embodiment assumes that filter processing uses a pixel region of 3×3 pixels. In this case, processing for one line at the top of the divided region in the direction of height and one line at the bottom also uses the pixel values of a preceding line or next line. Therefore, the overlapping region is two lines in the direction of height of the band, as shown in FIG. 10.

Although the DMA-transferred sub-region is divided into three partial images, it is also possible to divide the sub-region into more than three partial images and extract three of the partial images. Note that the number of partial images obtained by division may be two. That is, it is only necessary to form partial images enough to effectively use the filter circuits. For example, if all processing pixels in filter processing cannot be input to the filter circuits owing to division into three, the division number may be decreased. Further, if all processing pixels in filter processing can be input to the filter circuits, a sub-region may be divided into more than three partial images. Note that the division number and the number of partial images to be extracted can be determined in accordance with the parallel processing ability such as the number of filter circuits for the numbers of colors and pixels processable in parallel in the processing apparatus, and the like.

Then, single-color pixels are acquired one by one from each divided partial image, and packed in fields I<0> to I<2> of an image processing command 155. More specifically, in the example of FIG. 10, one monochrome pixel is extracted from each of lines (A-0), (A-8), and (A-16), and these monochrome pixels are stored in the fields I<0> to I<2> of the image processing command 155. If the positions of pixels to be extracted on respective lines are made to coincide with each other, control when generating an image processing command from a partial image can be facilitated. For example, it is initially set to extract pixels corresponding to a pixel indicated by pixel number "0" in 414 of FIG. 7 from these three lines. In addition, the height of a band to be temporarily stored in the intermediate buffer is set to equalize the numbers of lines of respective partial images. This facilitates control when generating an image processing command.

For a CMYK image, four single-color pixel values can be acquired by extracting four partial images and extracting pixel values from the partial images, and be converted into a command 520 or 522 of four color components, as shown in FIG. 9C. Even in this case, it is also possible to divide a sub-region into more than four partial images and extract four of the partial images. Alternatively, the number of partial images may be set to three or less.

Figure 13:
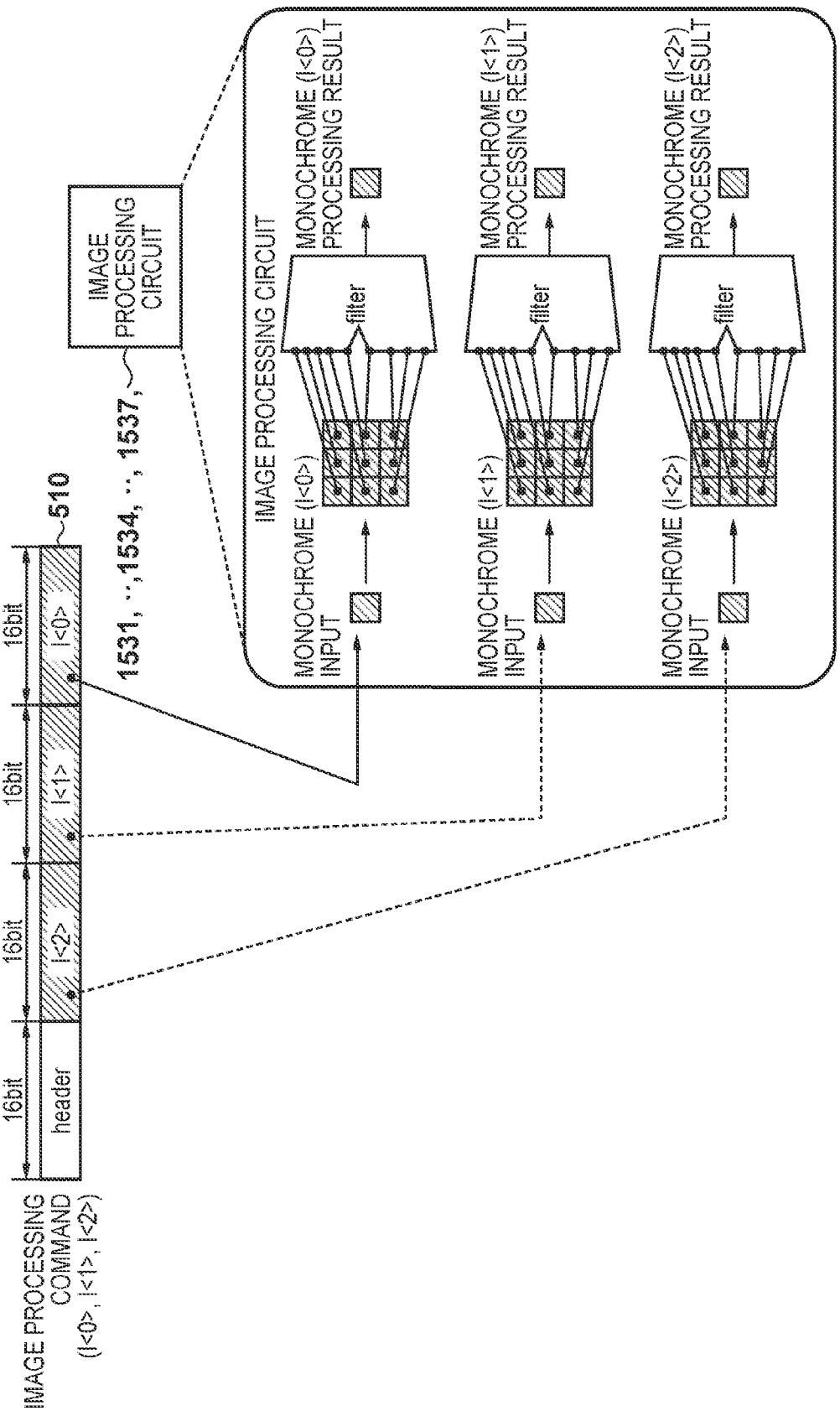
FIG. 13 is a block diagram for explaining an example of the operation of an image processing circuit.

After that, the image processing command including a plurality of single-color pixel values is input to image processing circuits (1) to (P) to execute image processing in parallel, as shown in FIG. 13, thereby obtaining an image processing command 156 after processing. At this time, the single-color pixels I<0>, I<1>, and I<2> are not adjacent pixels, so respective filter circuits can store all the pixel values of processing pixels in filter processing in the internal delay memories (not shown) of the filter circuits and can execute filter processing. Since neighboring pixels are deleted by filter processing in the image processing command after processing, single-color pixels corresponding to line (A-0) and line (A-25) are not output. As for line (A-0) and line (A-25), it is also possible to execute filter processing using a dummy pixel value as the pixel value of a preceding or succeeding line, and output the result of the filter processing. Accordingly, the image processing apparatus can obtain a plurality of single-color pixels I<0>, I<1>, and I<2> after processing from the image processing command 156 after processing.

After the end of processing lines (A-0), (A-8), and (A-16), one next line is extracted from each of the partial images, and the above-described processing is repeated. Processes on the respective partial images are therefore executed in parallel. After the end of processing the respective partial images, partial images corresponding to the respective partial images are obtained. The plurality of partial images are gathered into one single-color image data in the course of temporarily storing single-color pixels after processing in the intermediate buffer from the image processing command after processing. Finally, the single-color pixel values after processing are DMA-transferred to respective storage areas of a RAM 106 that correspond to band regions after processing, thereby writing the single-color image data after processing.

(Image Processing Sequence)

Figure 14:
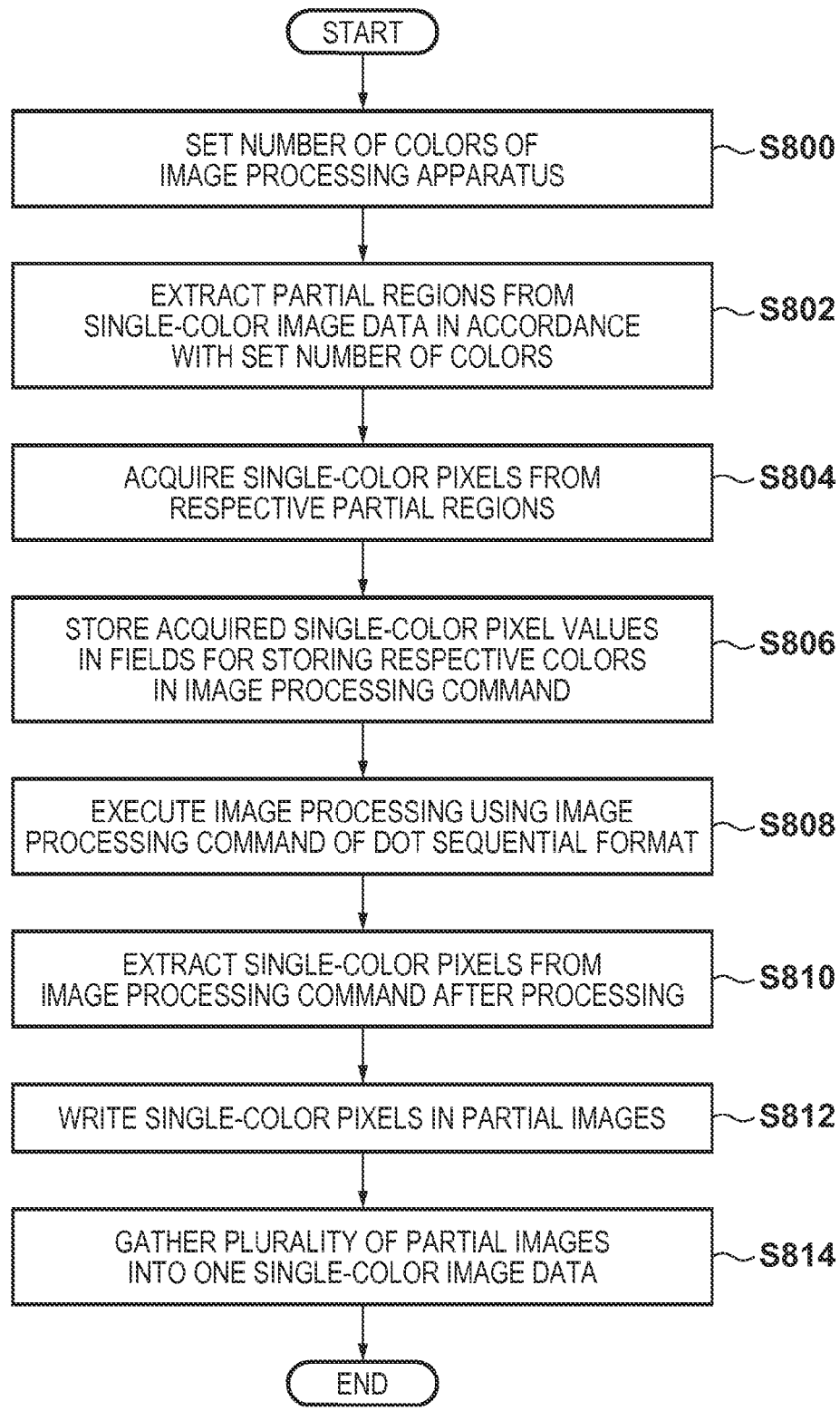
FIG. 14 is a flowchart showing a single-color image processing sequence.

An image processing sequence will be summarized with reference to FIG. 14. The image processing apparatus sets the number of color components (number of colors) that can be supported, or the number of colors corresponding to a command to be used. For example, the number of colors is set to be "3" when a command 540 in FIG. 9B is used, and "4" when a command 590 is used (step S800). For example, when the image processing apparatus can support both RGB and CMYK, it can support color processing of four colors, and the number of colors may be set to be "4".

Then, the image processing apparatus divides, in accordance with the set number of colors, single-color image data temporarily stored in the intermediate buffer, thereby extracting partial images (step S802). For example, the image processing apparatus extracts three partial images from the single-color image data when the set number of colors is "3", and four partial images from the single-color image data when the set number of colors is "4".

Then, the image processing apparatus acquires single-color pixel values from the respective pixel regions (step S804). The image processing apparatus stores data of the single-color pixel values in fields for storing data of the respective color components of a color image in an image processing command as shown in FIG. 9B (step S806). The image processing apparatus generates an image processing command such as a command 510 in FIG. 9C when the set number of colors is "3", and an image processing command such as the command 520 in FIG. 9C when the set number of colors is "4".

The image processing apparatus executes image processing via these commands by using an image processing execution unit 153, as described above (step S808). The image processing apparatus extracts a plurality of single-color pixel values included in an image processing command after processing output from the image processing execution unit 153 (step S810). The image processing apparatus writes the extracted single-color pixels in storage areas of the intermediate buffer for the respective partial images, and temporarily holds them (step S812). Finally, the image processing apparatus writes, in the RAM 106, the partial images temporarily held in the intermediate buffer, and gathers them into one single-color image data (step S814).

(Partial Image Extraction Processing Sequence)

Figure 15:
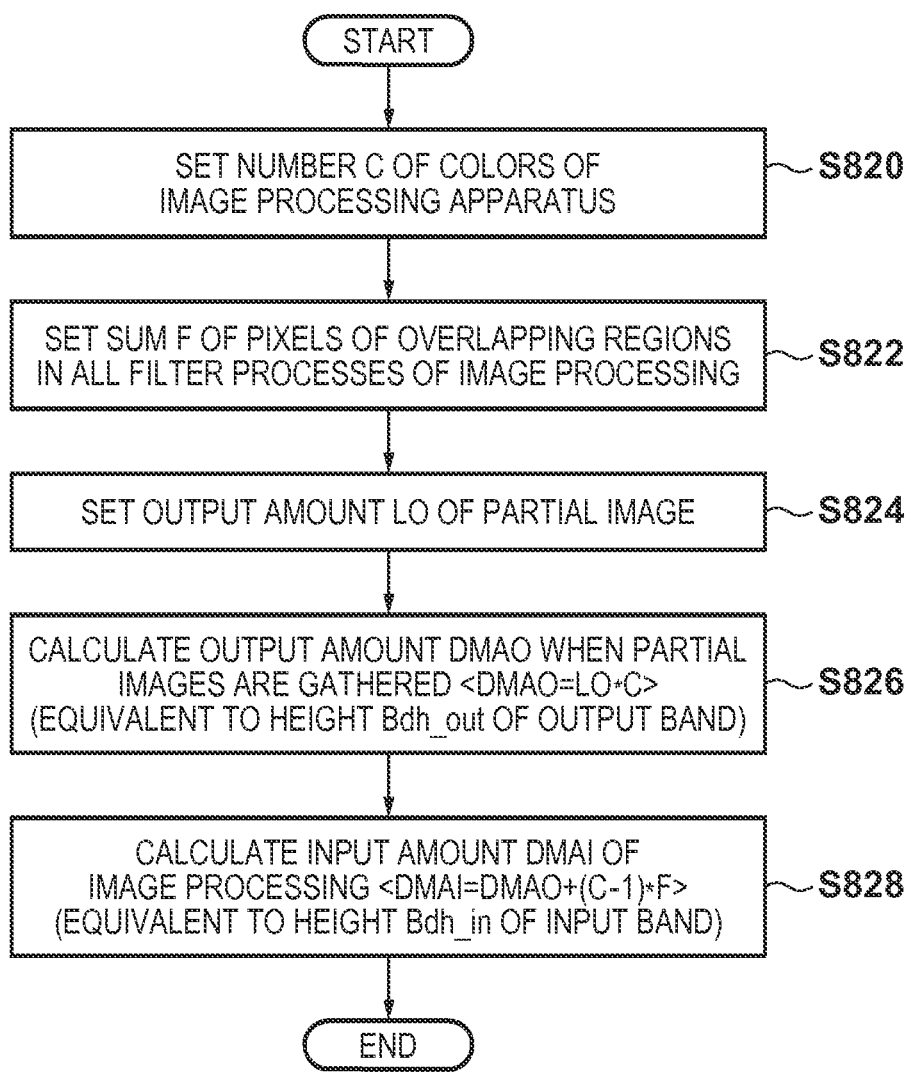
FIG. 15 is a flowchart showing a partial image extraction processing sequence.

Subsequently, a partial image extraction processing sequence according to this embodiment will be explained with reference to the flowchart of FIG. 15. In this processing, first, the image processing apparatus sets the number of color components (number of colors) that can be supported, or the number of colors corresponding to a command to be used, as in the image processing step (step S820). At this time, the set number of colors is indicated by C.

Then, the image processing apparatus sets a sum (cumulative total) F of the numbers of pixels of overlapping regions in all filter processes to be executed by the image processing execution unit 153 (step S822). For example, when the number of taps of filter processing is "5×3", F is two pixels. For example, when a filter having "5×3" taps is executed four times, F is eight (=2×4) pixels. If a filter having "5×7" taps is executed once more, six pixels are added to the overlapping region and F becomes 14 pixels. In this embodiment, an overlapping region is added in the direction of height of the band. Since the overlapping region in filter processing means processing pixels excluding one center pixel, the number of pixels obtained by subtracting one pixel from the number of taps in the direction of height of the band is the number of pixels of the overlapping region.

F can be calculated by accumulating the numbers of pixels of respective overlapping regions in accordance with filter processing to be executed.

Then, the image processing apparatus sets an output amount LO of a partial image output after deleting the pixels of the overlapping region after filter processing (step S824). In the embodiment, image data is divided in the direction of height of the band to extract partial images, so the output amount LO equals the number of pixels of the partial image in the direction of height. Based on these settings, the image processing apparatus calculates an output amount DMAO of image data when gathering partial images after processing (step S826). The output amount DMAO is a value obtained by multiplying the output amount LO and the number C of colors. In the first embodiment, the calculated output amount DMAO is equal to the above-mentioned height Bdh_out of an output band. The size of the output image region of the above-described intermediate buffer is a capacity obtained by multiplying the output amount DMAO by the 32-byte transfer unit.

Finally, the image processing apparatus calculates an input amount DMAI of image processing by using the above-described setting values and calculated value (step S828). The overlapping region exists only between two pixel images. Thus, the input amount DMAI is calculated by adding, to the output amount DMAO, a value obtained by multiplying the sum F of the overlapping regions and a value (C−1) obtained by subtracting 1 from the number of colors. In this embodiment, the calculated input amount DMAI equals the above-mentioned height Bdh_in of an input band, similarly to the output amount DMAO. The size of the input image region of the above-described intermediate buffer is a capacity obtained by multiplying the input amount DMAI by the 32-byte transfer unit.

In this way, the size of a partial image to be extracted in accordance with the number of colors, and the capacity of the intermediate buffer can be calculated.

As described above, according to this embodiment, single-color image data is loaded to the intermediate buffer, and partial images are extracted from the single-color image data accumulated in the intermediate buffer by a number corresponding to the number of color components of an image processing command of the dot sequential format for a color image. Single-color pixels are acquired from the respective partial images, and data of the plurality of single-color pixels are stored in fields for storing data of the respective color components of one image processing command for the color image. By performing image processing on the image processing command, single-color pixels corresponding to the number of colors that can be supported by the image processing apparatus can be processed in parallel (simultaneously) by one process. This can increase the processing speed. Note that the speed can be increased by an improvement of an image input/output unit in the image processing apparatus. Therefore, the color image processing circuit (hardware resource) of the image processing execution unit that occupies most of the image processing apparatus can be used directly. That is, the circuit scale of the image processing execution unit need not be greatly increased for processing of single-color image data. The processing speed of single-color image data can also be increased even in local (neighbourhood) image processing requiring a plurality of processing pixels, such as filter processing.

Second Embodiment

Figure 11:
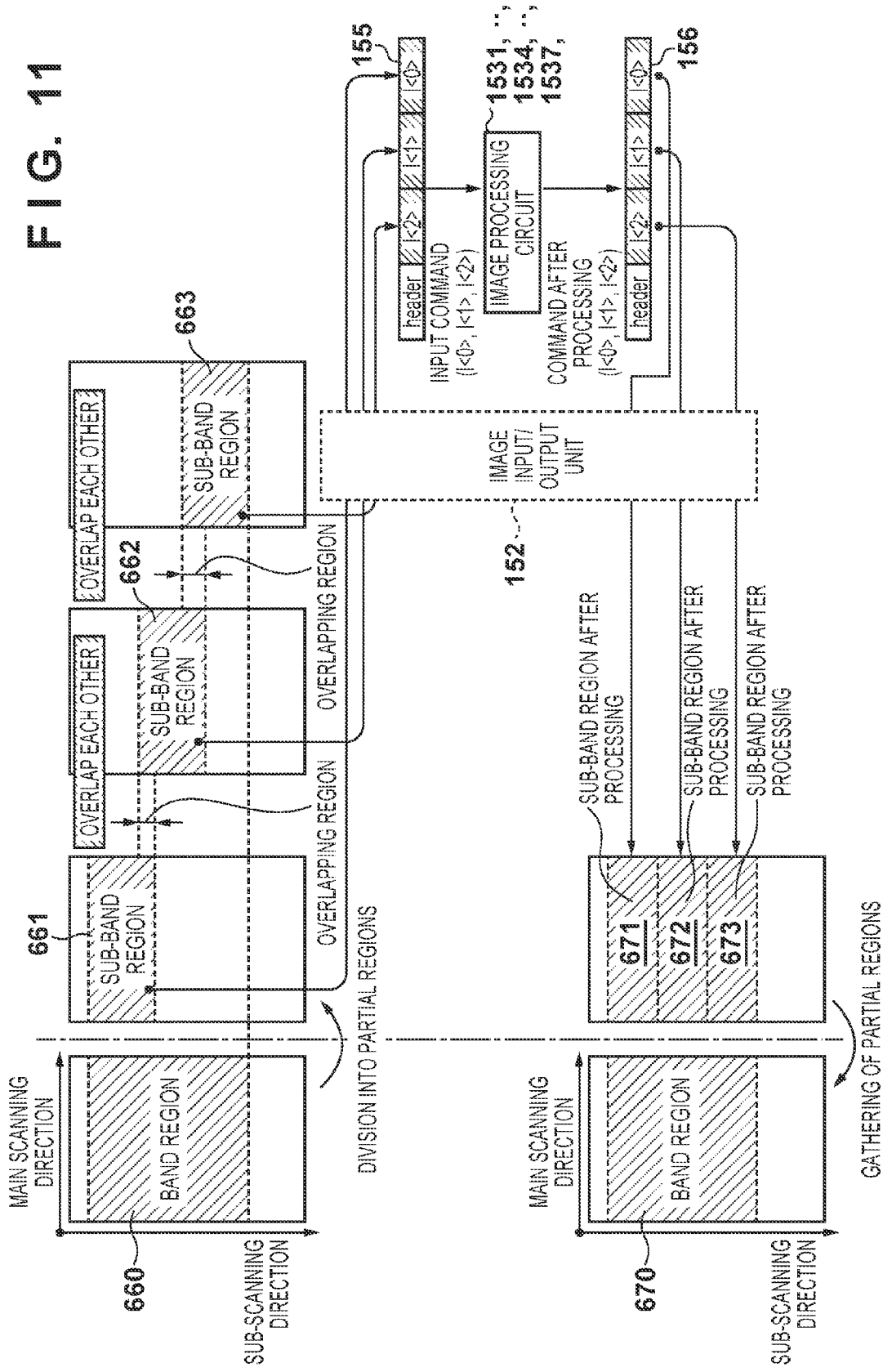
FIG. 11 is a view for explaining another example of division of a single-color image and command generation.

In the first embodiment, single-color image data is loaded to the intermediate buffer for each sub-region serving as part of the band region. The single-color image data temporarily held in the intermediate buffer is divided in accordance with the number of colors processable by an image processing command, and is converted into an image processing command. In the second embodiment, one band region 660 on the paper surface is handled by dividing it into overlapping sub-band regions 661, 662, and 663, as shown in FIG. 11. A command supporting three colors, like image processing commands 155 and 156, will be exemplified below.

In this embodiment, one band region 660 on the paper surface is divided into the three sub-band regions 661 to 663 in accordance with the number of colors of the command. A single-color image is read out from a RAM 106 three different times for the respective sub-regions (processing units) of the divided sub-band region. Unlike the above description, DMA transfer is executed three times at different "first addresses" for one sub-region.

All the readout single-color image data of the three sub-regions are temporarily stored in an intermediate buffer 232. Then, three single-color pixels I<0>, I<1>, and I<2> are read out from predetermined pixel numbers (coordinates) of the three sub-regions, and stored in fields corresponding to pixel data (R, G, and B) of an image processing command of the dot sequential format for a color image. An image processing execution unit 153 executes image processing using respective pixel values included in the image processing command, and a plurality of single-color pixels after processing are obtained from the image processing command after processing. Finally, the single-color pixels after processing are DMA-transferred three different times to respective storage areas of the RAM 106 that correspond to sub-band regions 671, 672, and 673 after processing. The single-color image data after processing are written, gathering the three partial images into one single-color image data.

Figure 12:
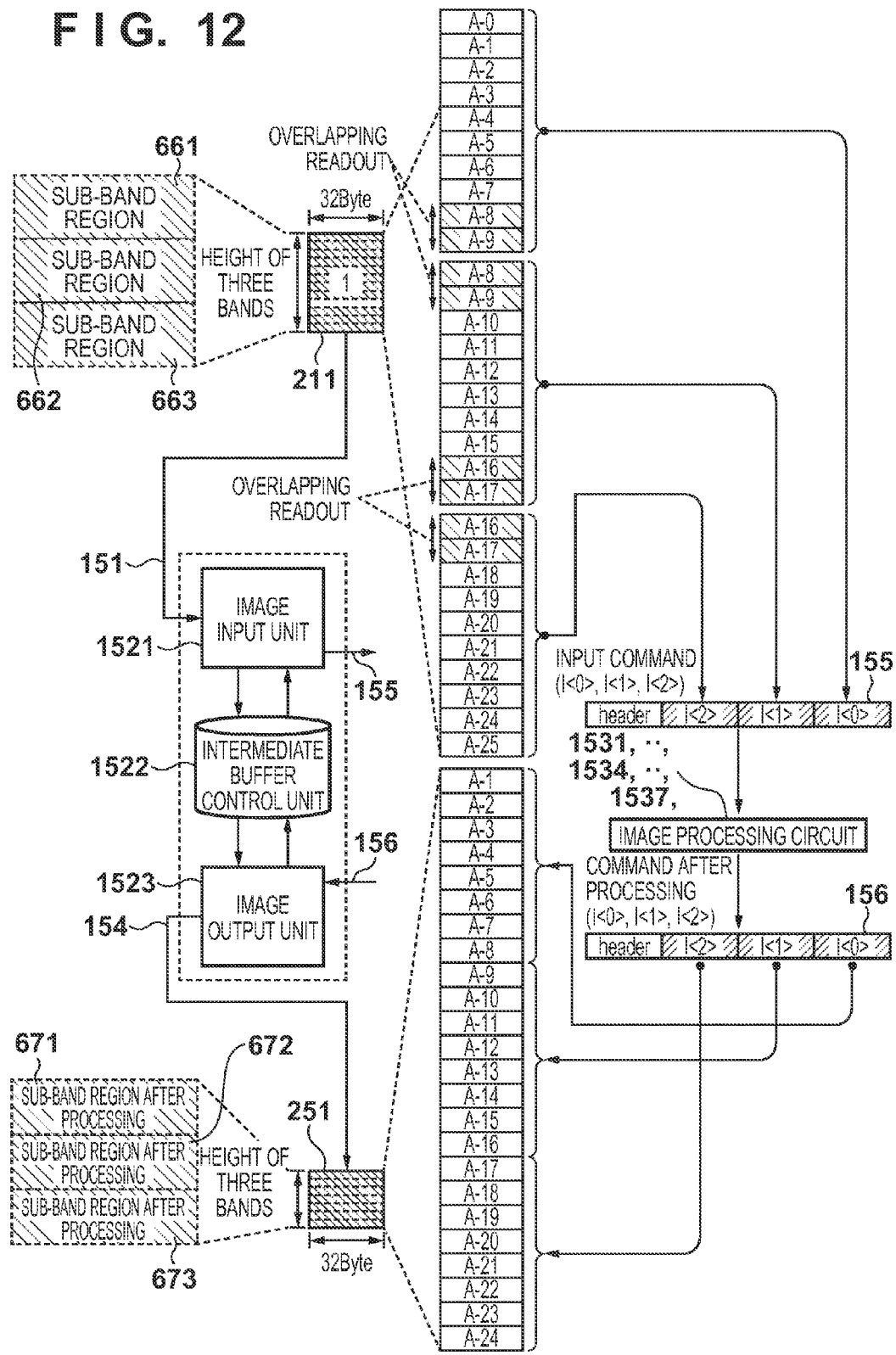
FIG. 12 is a view for explaining still another example of division of a single-color image and command generation.

In this embodiment, as shown in FIG. 12, single-color image data in the RAM 106 is divided into partial images, and the partial images are loaded to the intermediate buffer by a plurality of times of DMA transfer. Hence, single-color image data of an overlapping line is repetitively read out to the intermediate buffer. Although the capacity of the intermediate buffer increases, this can be coped with by only changing the settings of DMACs 194 and 196, and a change from the conventional image input/output unit 152 can be minimized.

As described above, according to the second embodiment, single-color image data is divided into a plurality of band regions including overlapping regions in accordance with the number of colors that can be supported by the image processing apparatus. The plurality of band regions are read/written by a plurality of times of DMA transfer. At this time, a conventional image processing apparatus supporting image data of the dot sequential format can be used as the image processing apparatus without a change. In the embodiment, single-color image data can be processed by changing software such as a driver/firmware that controls the image processing apparatus. The software determines the division method of the band region (calculates the value of the height of the band), and changes control of DMA transfer (number of times of transfer, transfer start address, and transfer amount).

(Image Processing Sequence)

An image processing sequence according to this embodiment is the same as the processing sequence in FIG. 14, and a description thereof will not be repeated.

(Partial Image Extraction Processing Sequence)

Figure 16:
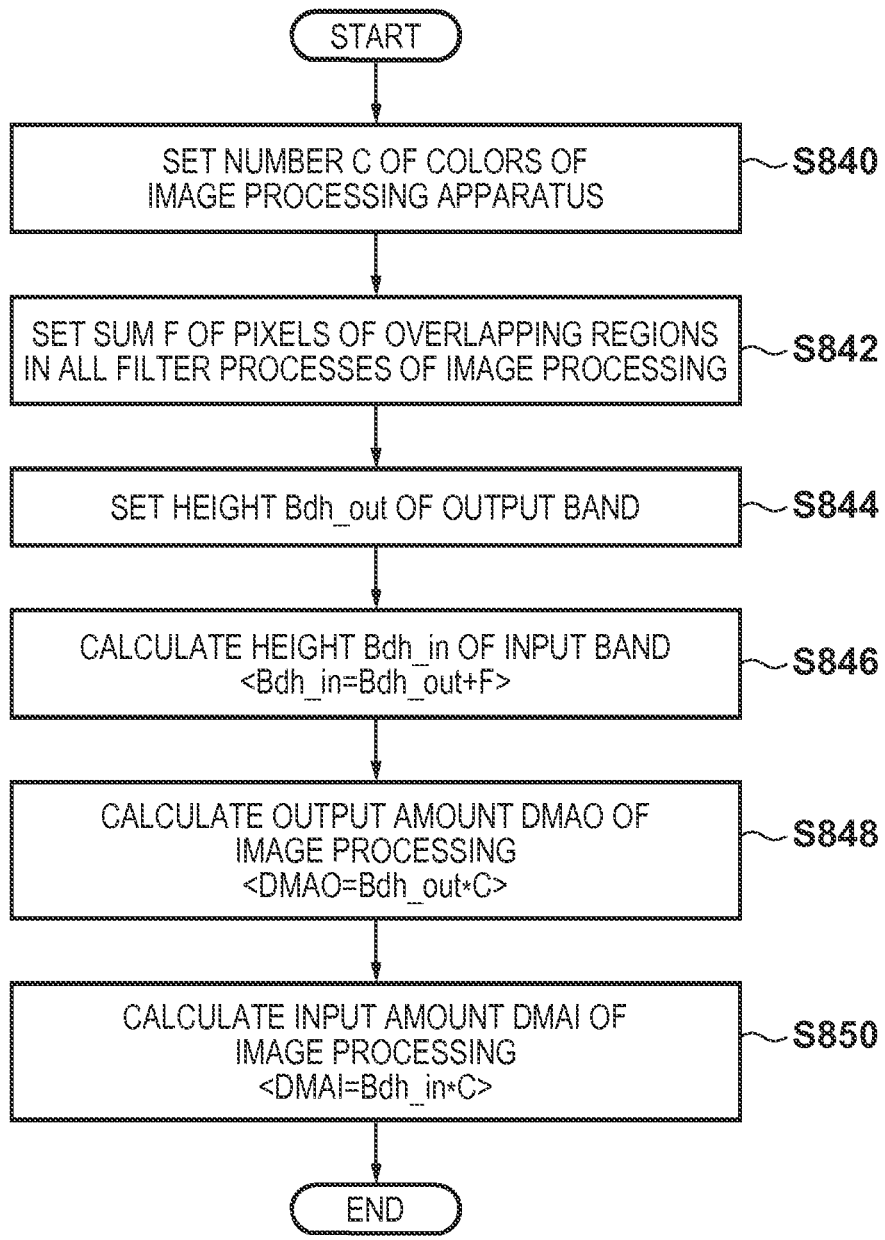
FIG. 16 is a flowchart showing a partial image extraction processing sequence.

A partial image extraction processing sequence according to this embodiment will be explained with reference to the flowchart of FIG. 16. By the same method as that in the first embodiment, the image processing apparatus sets the number C of colors, and a sum (cumulative total) F of overlapping regions in all filter processes to be executed by the image processing execution unit 153 (steps S840 and S842). Then, the image processing apparatus sets a height Bdh_out of an output band serving as a partial image output after deleting the pixels of the overlapping region after filter processing, and a height Bdh_in of an input band (steps S844 and S846). The height Bdh_in of the input band is a value obtained by adding the height Bdh_out of the output band and the sum (cumulative total) F of overlapping regions.

Based on these settings and calculated value, the image processing apparatus calculates an output amount DMAO when gathering partial images to be output (step S848). The output amount DMAO is a value obtained by multiplying the height Bdh_out of the output band and the number C of colors. In this embodiment, the calculated output amount DMAO is different from the height Bdh_out of the output band. The size of the output image region of the above-described intermediate buffer is a capacity obtained by multiplying the output amount DMAO by the 32-byte transfer unit. Finally, the image processing apparatus calculates an input amount DMAI of image processing by using the above-described setting values and calculated value (step S850). In this embodiment, the overlapping region is read out from the RAM 106 in accordance with the number of colors, as needed. Thus, the input amount DMAI is a value obtained by multiplying the number of colors and the height Bdh_in of the input band. In this embodiment, the calculated input amount DMAI differs from the above-mentioned height Bdh_in of the input band. The size of the input image region of the above-described intermediate buffer is a capacity obtained by multiplying the input amount DMAI by the 32-byte transfer unit.

In this fashion, the size of a partial image to be divided and extracted in accordance with the number of colors, and the capacity of the intermediate buffer can be calculated in this embodiment.

As described above, according to this embodiment, a conventional image processing apparatus supporting image data of the dot sequential format can be used as the image processing apparatus without a change. The image processing apparatus need not be improved for processing of single-color image data, and the circuit scale does not increase. According to this embodiment, the processing speed of single-color image data can be increased by only changing a driver/firmware for controlling the image processing apparatus when processing single-color image data.

Third Embodiment

The third embodiment will describe processing when performing resolution conversion to enlarge or reduce an input image and convert the image to a desired size. Generally, an image processing apparatus capable of supporting processing of a color image includes resolution conversion filter circuits for respective color components. The resolution conversion sometimes causes degradation of the image quality such as moiré in an image after processing depending on the degree of enlargement/reduction. To reduce the degradation of the image quality, the image processing apparatus sometimes changes the initial phase of the resolution conversion filter. In general, an image processing apparatus capable of supporting processing of a color image performs resolution conversion in one pixel unit including a plurality of color components. Therefore, a register that changes the initial phase is common to all color components.

Figure 17:
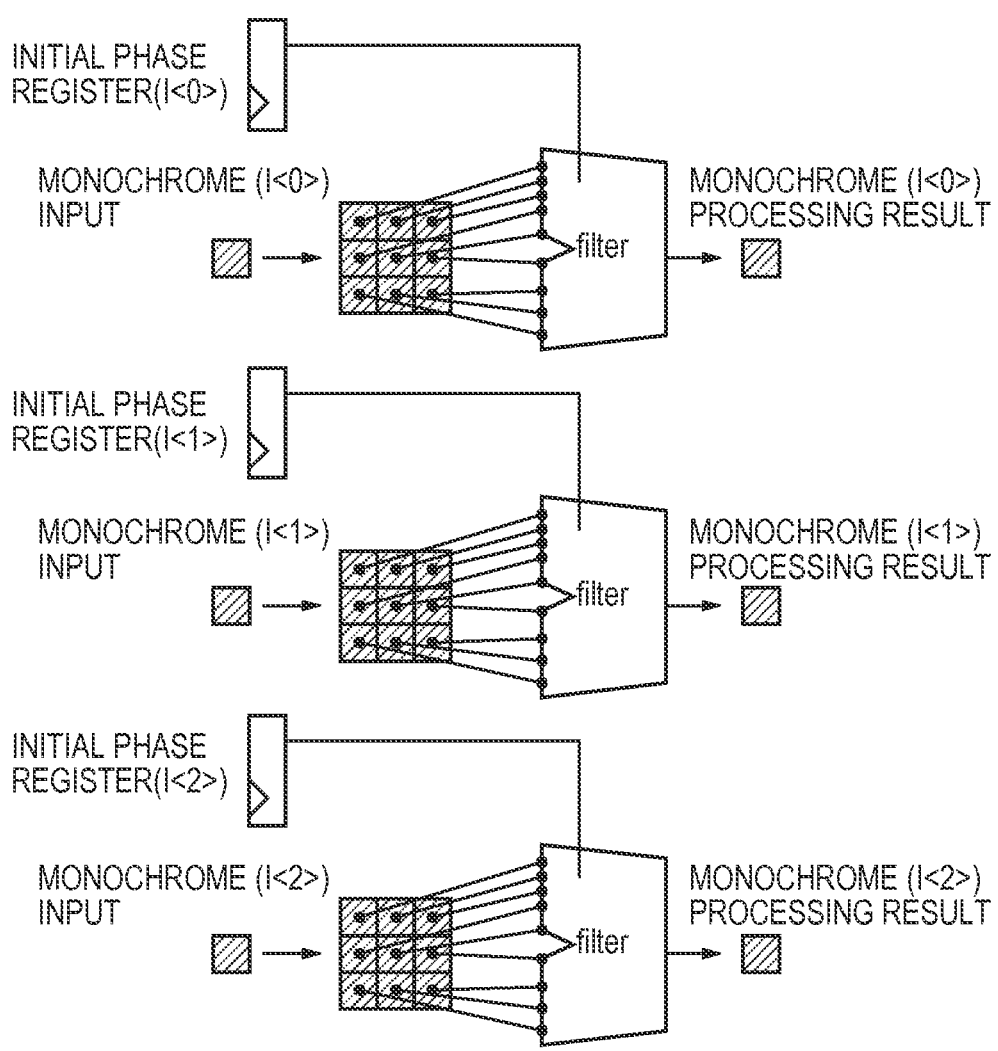
FIG. 17 is a block diagram for explaining an example of the operation of a resolution conversion circuit.

However, in this embodiment, a plurality of partial images are extracted from single-color image data, and pixels are acquired from the partial images to generate an image processing command of the dot sequential format. To do this, initial phase setting registers are arranged for respective color components in this embodiment, as shown in FIG. 17. The initial phase of each partial image is calculated from the setting of the initial phase at the start of a page, and set in advance in the initial phase setting register for each color component before executing image processing.

In some cases, unlike the above-described embodiments, the sizes (for example, band heights) of partial images cannot be uniformed to the same value depending on the degree of enlargement/reduction and the setting of the initial phase at the start of a page. In such a case, in accordance with a smallest partial image out of partial images, the sizes of the remaining partial images are reduced to uniform these sizes. At this time, the initial phase of each partial image changes from one before reduction, and is calculated again. Conversely, partial images may be uniformed by a method of enlarging the processing region of a small partial image in accordance with a largest partial image. At this time, pixels included in the enlarged processing region undergo image processing a plurality of times. However, the image processing result is the same and can be directly written in a RAM 106 without any problem. It may be set not to write pixels included in the enlarged processing region in accordance with a DMA setting at the time of write in the RAM 106 from the intermediate buffer.

As described above, according to this embodiment, by partially correcting the resolution conversion (enlargement/reduction) circuit of the image processing apparatus, the processing speed of single-color image data can be increased even in filter processing in which the initial phase of a divided image changes.

Note that the above-described embodiments have explained a case in which an image processing command for a color image has a command format in which data of respective colors are stored in one pixel. However, the above-described embodiments are also applicable to a case in which a command of another dot sequential format is used, for example, a command format in which RGB image data of the dot sequential format are stored in two pixels is used. For example, when the command format in which RGB image data of the dot sequential format are stored in two pixels is used, each method described above can be applied by acquiring single-color pixels from six partial images extracted from single-color image data, and generating a command including the six single-color pixel values.

In the above-described embodiments, the read/write unit of image data is 32 bytes. However, the read/write unit of image data need not always be 32 bytes depending on the constitution method of the RAM 106 in the image processing apparatus, the type of storage device (for example, DRAM) that implements the RAM 106, the type of image processing to be executed, and the like. When the read/write unit is changed, only the capacity of the intermediate buffer that stores image data changes, and the method of generating an image processing command including a single-color image does not change.

Each of the above-described embodiments is also easily applicable to a case in which the 32-byte data structure of image data represents 4×2 pixels as in 494 of FIG. 6. In the above-described embodiments, the capacity of the intermediate buffer is assigned based on the height Bdh_in of the input band or the height Bdh_out of the output band. Alternatively, when a data structure of 4×2 pixels is used, the capacity of the intermediate buffer may be assigned based on a value obtained by dividing the height Bdh_in of the input band or the height Bdh_out of the output band by 2.

The above-described embodiments have mainly explained band processing. However, the method in each of the above-described embodiments is also applicable to block (tile) processing that is another region division method. In block (tile) processing, the region of image data is two-dimensionally divided in the main scanning direction and the sub-scanning direction. For example, a sub-region (processing unit) explained in the above-described embodiments corresponds to a two-dimensionally divided pixel region. A method of sequentially reading out sub-regions (1) to (M) is block (tile) processing itself. A main difference between block (tile) processing and band processing is merely a difference in the pixel scanning direction when generating pixels from image data. In block (tile) processing, pixels input to the image processing execution unit are scanned in the main scanning direction. In band processing of the present invention, pixels input to the image processing execution unit are scanned along the band height (sub-scanning direction). However, in both of the cases, an image processing command is so generated as to include a plurality of single-color images.

When the RAM 106 has a sufficient storage capacity and the capacity of the delay memory in local (neighbourhood) image processing need not be saved, it is also possible to store the image data 300 of one page in the RAM 106 without performing band processing, and perform image processing in one page unit. At this time, the capacities of the input and output areas of the intermediate buffer can be assigned not at the height of the band, but at the size of image data in the sub-scanning direction.

Note that the RAM 106 of the present invention is not limited to a volatile memory, such as an SRAM (Static Random Access Memory) or a DRAM (Dynamic Random Access Memory), and can be a non-volatile memory such as a flash memory. In addition, an external storage device such as a hard disk can be used as the RAM 106 of the present invention. In other words, even if a claim comprises the term "RAM", the RAM means not only the volatile memory, but also the non-volatile memory or the external storage device.

According to the present invention, the speed can be increased by distributed parallelization of the performance of image processing at the time of single-color processing in the color processing-based image processing apparatus supporting image data of the dot sequential format.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-257394, filed Dec. 12, 2013, which is hereby incorporated by reference herein in its entirety.

What is claimed is:

1. A control apparatus that performs control for causing a processing apparatus to execute image processing of single-color image data, wherein the processing apparatus is configured to accept an image processing command including a plurality of fields, each capable of storing a respective one of a plurality of color components in a dot sequential format, and to execute image processing by using pixel values included in the image processing command, the control apparatus comprising:
an extraction circuit configured to extract, from single-color image data, a plurality of partial images by a number corresponding to the number of color components;
a generation circuit configured to acquire single-color pixel values from each of the plurality of partial images, store the single-color pixel values in each of the plurality of fields, and generate an image processing command; and
an input circuit configured to input the generated image processing command to the processing apparatus, and cause the processing apparatus to execute image processing using the pixel values included in the image processing command.

2. The apparatus according to claim 1, further comprising a gathering circuit configured to accept, from the processing apparatus, data including the single-color pixel values after the image processing that correspond to each of the plurality of partial images, and gather the single-color pixel values after the image processing, thereby generating single-color image data having undergone the image processing.

3. The apparatus according to claim 1, further comprising a holding circuit configured to temporarily hold at least one of a single-color pixel value before the image processing and a single-color pixel value after the image processing.

4. The apparatus according to claim 2, further comprising a holding circuit configured to temporarily hold a single-color pixel value after the image processing,
wherein said gathering circuit temporarily holds, in said holding circuit, the single-color pixel values after the image processing that correspond to each of the plurality of partial images, and gathers the single-color pixel values to generate one single-color image data having undergone the image processing, and the one generated single-color image data is written in a RAM.

5. The apparatus according to claim 3, wherein said holding circuit reads out the single-color pixel values before the image processing from a RAM for one single-color image data, and holds the single-color pixel values before the image processing, and said extraction circuit extracts the plurality of partial images from the one single-color image data held in said holding circuit.

6. The apparatus according to claim 5, wherein said extraction circuit extracts the plurality of partial images equal in a length of at least one side in an image region, and said holding circuit reads out, from the RAM, one single-color image data including the plurality of partial images, and holds the one single-color image data.

7. The apparatus according to claim 3, wherein said holding circuit holds single-color pixel values after the image processing for each of the plurality of partial images, and the single-color pixel values after the image processing for each of the plurality of partial images are written in a RAM, and the single-color pixel values after the image processing for each of the plurality of partial images are gathered in the RAM to generate one single-color image data having undergone the image processing.

8. The apparatus according to claim 3, wherein said extraction circuit reads out and extracts each of the plurality of partial images from one single-color image data stored in a RAM, and said holding circuit holds the readout partial images.

9. The apparatus according to claim 1, wherein said extraction circuit extracts the plurality of partial images by dividing the single-color image data.

10. The apparatus according to claim 1, wherein said extraction circuit divides the single-color image data into images larger in number than the color components, and selects and extracts the plurality of partial images from the images obtained by division.

11. The apparatus according to claim 9, wherein said extraction circuit divides the single-color image data by using a band region as a circuit, and extracts the plurality of partial images.

12. The apparatus according to claim 1, wherein the plurality of partial images have overlapping regions.

13. The apparatus according to claim 12, wherein the overlapping regions are determined in accordance with pixel regions to be processed in the image processing.

14. The apparatus according to claim 1, wherein said generation circuit acquires, from each of the plurality of partial images, the single-color pixel values at corresponding positions in the partial images, and generates the image processing command.

15. The apparatus according to claim 1, wherein the image processing includes filter processing.

16. The apparatus according to claim 1, wherein the image processing includes resolution conversion.

17. The apparatus according to claim 16, wherein the plurality of partial images include overlapping regions that are determined in accordance with an initial phase of the resolution conversion.

18. The apparatus according to claim 16, further comprising a setting circuit configured to set an initial phase in the resolution conversion for each of the plurality of partial images.

19. The apparatus according to claim 1, wherein the plurality of color components are R (Red), G (Green), and B (Blue), and the number of color components is three.

20. The apparatus according to claim 1, wherein the plurality of color components are C (Cyan), M (Magenta), Y (Yellow), and K (blacK), and the number of color components is four.

21. An image processing apparatus comprising a control apparatus defined in claim 1, and a processing apparatus.

22. A control method for causing a processing apparatus to execute image processing of single-color image data, wherein the processing apparatus is configured to accept an image processing command including a plurality of fields, each capable of storing a respective one of a plurality of color components in a dot sequential format, and to execute image processing by using pixel values included in the image processing command, wherein the control method is performed by a processing apparatus that comprises a plurality of processing circuits so as to cause the processing apparatus to execute steps comprising:

extracting, from single-color image data, a plurality of partial images by a number corresponding to the number of color components;

generating an image processing command by acquiring single-color pixel values from each of the plurality of partial images and by storing the single-color pixel values in each of the plurality of fields; and inputting the generated image processing command to the processing apparatus to cause the processing apparatus to execute image processing using the pixel values included in the image processing command.

23. A non-transitory computer-readable storage medium storing a computer program for causing a computer arranged in a control apparatus that performs control for causing a processing apparatus to execute image processing of single-color image data, wherein the processing apparatus is configured to accept an image processing command including a plurality of fields, each capable of storing a respective one of a plurality of color components in a dot sequential format, and to execute image processing by using pixel values included in the image processing command, the computer program including code to:

extract, from single-color image data, a plurality of partial images by a number corresponding to the number of color components;

acquire single-color pixel values from each of the plurality of partial images, store the single-color pixel values in each of the plurality of fields, and generate an image processing command; and input the generated image processing command to the processing apparatus, and cause the processing apparatus to execute image processing using the pixel values included in the image processing command.

* * * * *